US006862526B2

(12) United States Patent
Robbins

(10) Patent No.: US 6,862,526 B2
(45) Date of Patent: Mar. 1, 2005

(54) GPS CORRECTION METHODS, APPARATUS AND SIGNALS

(75) Inventor: James E. Robbins, El Granada, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 0 days.

(21) Appl. No.: 10/821,022

(22) Filed: Apr. 7, 2004

(65) Prior Publication Data

US 2004/0204852 A1 Oct. 14, 2004

Related U.S. Application Data

(63) Continuation of application No. 09/997,372, filed on Nov. 29, 2001.
(60) Provisional application No. 60/255,987, filed on Dec. 15, 2000.

(51) Int. Cl.[7] .............................................. G01C 21/00
(52) U.S. Cl. ....................... 701/214; 701/210; 701/224; 340/995.21; 340/995.25
(58) Field of Search ................................. 701/214, 200, 701/210, 213, 224, 1, 24, 36; 73/178 R; 340/995.21, 995.25

(56) References Cited

U.S. PATENT DOCUMENTS

| | | |
|---|---|---|
| 3,520,126 A | 7/1970 | Novikov et al. |
| 3,811,265 A | 5/1974 | Cater |
| 3,852,534 A | 12/1974 | Tilk |
| 3,881,310 A | 5/1975 | Gerum et al. |
| 3,941,984 A | 3/1976 | Chappell et al. |
| 4,014,166 A | 3/1977 | Cateora et al. |
| 4,024,923 A | 5/1977 | Merrick |
| 4,204,398 A | 5/1980 | Lemelson |
| 4,209,975 A | 7/1980 | Moritani et al. |
| 4,218,654 A | 8/1980 | Ogawa et al. |
| 4,287,597 A | 9/1981 | Paynter et al. |
| 4,292,683 A | 9/1981 | Jueneman |
| 4,334,314 A | 6/1982 | Nard et al. |
| 4,337,463 A | 6/1982 | Vangen |

(List continued on next page.)

FOREIGN PATENT DOCUMENTS

| | | |
|---|---|---|
| WO | WO 92/03747 | 3/1992 |
| WO | WO 93/00593 | 1/1993 |

OTHER PUBLICATIONS

P. Enge, Waas Messaging System: Data Rate, Capacity, and Forward Error Correction, Navigation: Journal of the Institute of Navigation, vol. 44, No. 1, Spring 1997, pp. 63–76.
D. Lapucha et al., High–Rate Precise Real–Time Positioning Using Differential Carrier Phase, Navigation: Journal of the Institute of Navigation, vol. 43, No. 3, 1996, pp. 1443–1449.

(List continued on next page.)

Primary Examiner—Olga Hernandez
(74) Attorney, Agent, or Firm—Bruce D. Riter

(57) ABSTRACT

Methods and apparatus are described and illustrated for producing GPS corrections, comprising: collecting measurements from a plurality of network reference stations; determining network corrections from the measurements; determining residual errors at one or more vernier-cell reference stations; and preparing vernier-cell corrections to compensate the residual errors within a vernier-cell region. Network correction streams are described and illustrated which contain network corrections derived from a plurality of network reference stations and residual error corrections derived from one or more vernier-cell reference stations. Methods and apparatus are described for employing such network correction streams in a virtual reference station to produce corrections and/or virtual measurements for use in a GPS receiver.

27 Claims, 26 Drawing Sheets

U.S. PATENT DOCUMENTS

| | | | |
|---|---|---|---|
| 4,449,830 A | 5/1984 | Bulgier |
| 4,463,357 A | 7/1984 | MacDoran |
| 4,482,225 A | 11/1984 | Gygax et al. |
| 4,494,211 A | 1/1985 | Schwartz |
| 4,512,667 A | 4/1985 | Doulton et al. |
| 4,543,657 A | 9/1985 | Wilkinson |
| 4,582,434 A | 4/1986 | Plangger et al. |
| 4,607,257 A | 8/1986 | Noguchi |
| 4,646,096 A | 2/1987 | Brown |
| 4,751,512 A | 6/1988 | Longaker |
| 4,797,677 A | 1/1989 | MacDoran et al. |
| 4,809,005 A | 2/1989 | Counselman, III |
| 4,814,711 A | 3/1989 | Olsen et al. |
| 4,912,475 A | 3/1990 | Counselman, III |
| 4,918,609 A | 4/1990 | Yamawaki |
| 5,001,730 A | 3/1991 | Franaszek et al. |
| 5,093,800 A | 3/1992 | Ifune |
| 5,099,245 A | 3/1992 | Sagey |
| 5,101,267 A | 3/1992 | Morales-Garza |
| 5,111,209 A | 5/1992 | Toriyama |
| 5,130,987 A | 7/1992 | Flammer |
| 5,138,631 A | 8/1992 | Taylor |
| 5,148,179 A | 9/1992 | Allison |
| 5,155,490 A | 10/1992 | Spradley, Jr. et al. |
| 5,202,829 A | 4/1993 | Geier |
| 5,220,333 A | 6/1993 | Penrod |
| 5,223,923 A | 6/1993 | Morales-Garza |
| 5,225,842 A | 7/1993 | Brown et al. |
| 5,235,633 A | 8/1993 | Dennison et al. |
| 5,243,530 A | 9/1993 | Stanifer et al. |
| 5,245,634 A | 9/1993 | Averbuch |
| 5,276,655 A | 1/1994 | Rialan et al. |
| 5,323,322 A | 6/1994 | Mueller et al. |
| 5,345,245 A | 9/1994 | Ishikawa et al. |
| 5,359,521 A | 10/1994 | Kyrtsos et al. |
| 5,365,447 A | 11/1994 | Dennis |
| 5,379,224 A | 1/1995 | Brown et al. |
| 5,379,320 A | 1/1995 | Fernandes et al. |
| 5,389,934 A | 2/1995 | Kass |
| 5,390,124 A | 2/1995 | Kyrtsos |
| 5,442,363 A | 8/1995 | Remondi |
| 5,621,646 A | 4/1997 | Enge et al. |
| 5,828,336 A | 10/1998 | Yunck et al. |
| 6,040,798 A | 3/2000 | Kinal et al. |

OTHER PUBLICATIONS

A. Evans et al., An Evaluation of Precise Kinematic On–The Fly GPS Positioning with Respect to a Moving Aircraft, Proceedings of ION GPS–96, Sep. 12–15, 1995, pp. 1623–1628.

R. Barker et al., Performance Comparison of Two Methods of Multiple Reference Stations DGPS, Proceedings of ION GPS–94, Sep. 20–23, 1994, pp. 1035–1041.

D. Lapucha et al., Multisite Real–Time DGPS System Using Satellite Data Link: Operational Results, vol. 40, No 3, Fall 1993, pp. 283–296.

H. Abidin, Multi–Monitor Station "On–the Fly" Ambiguity Resolution: The Impacts of Satellite Geometry and Monitor Station Geometry, Plan '92 Position Location and Navigation Symposium, IEEE, 1992, pp. 412–418.

C. Kee et al., Wide Area Differential GPS, Navigation: Journal of the Institute of Navigation, vol. 38, No. 2, Summer 1991, pp. 123–145.

GPS Interface Control Document ICD–GPS–200, ARINC Research Corporation, Revision B, 1991.

J. Robbins, Reference Trajectories From GPS Measurements, Navigation: Journal of The Institute of Navigation, vol. 35, No. 1, Spring 1998, pp. 89–103.

R. Hatch, The Promise of a Third Frequency, GPS World, May 1996, pp. 55–58.

P. Enge et al., Wide Area Augmentation of the Global Positioning System, Proceedings of the IEEE, vol. 84, No. 8, Aug. 1996, pp. 1063–1088.

D. Lapucha et al., Multi–Site Real–Time DGPS System Using Starfix Link: Operational Results, ION GPS–92 Proceedings, Sep. 16–18, 1992, pp. 581–588.

M. Lage et al., The FAA's WIB/WDGPS Testbed and Recent Test Results, ION GPS–93 Proceedings, Sep. 22–24, 1993, pp. 487–493.

F. Haas et al., GPS Wide Area Augmentation System (WAAS) Testbed Results—Phase 1D Testbed Results, ION Annual Meeting Jun. 6–8, 1994, pp. 239–248.

C. Kee et al., Algorithms and Implementation of Wide Area Differential GPS, ION GPS–92 Proceedings, Sep. 16–18, 1992, pp. 565–572.

C. Kee, Wide Area Differential GPS (WADGPS), Changdon Kee, Dec. 1993, pp. 1–128.

C. Goad, Surveying with GPS, The Global Positioning System, pp. 1–17.

H. Janes et al., Analysis of tropospheric delay prediction models: comparisons with ray–tracing and implications for GPS relative positioning, Bulletin Geodeslque, vo. 65, pp. 151–161, 1991.

T. Walter et al., Flight Trials of the Wide Area Augmentation system (WAAS) ION GPS–94 Proceedings, Sep. 20–23, 1994, pp. 1537–1546.

T. Logsdon, The Navstar Global Positioning System, Van Nostrand Reinhold, 1992.

International Searching Authority; International Search Report PCT/US01/48445; Aug. 7, 2002 (WO02061449 A1).

Enge P. et al.: "Local Area Augmentation of GPS for the Precision Approach of Aircraft," Proceedings of the IEEE, IEEE, New York, US, vol. 87, No. 1, Jan. 1999, pp. 111–132.

Enge P. et al.: "Wide Area Augmentation of the Gobal Positioning System" Proceedings of the IEEE, IEEE, New York, US, vol. 84, no. 6, Aug. 1, 1996, pp. 1063–1087.

Enge P. et aL: "Design of the signal and data format for wide area augmentation of the Global Positioning System" Position Location and Navigation Symposium, IEEE 1996 Atlanta, Apr. 22–26, 1996, pp. 485–495.

NETWORK PROCESSOR FLOW

PREPROCESS MEASUREMENTS 1140

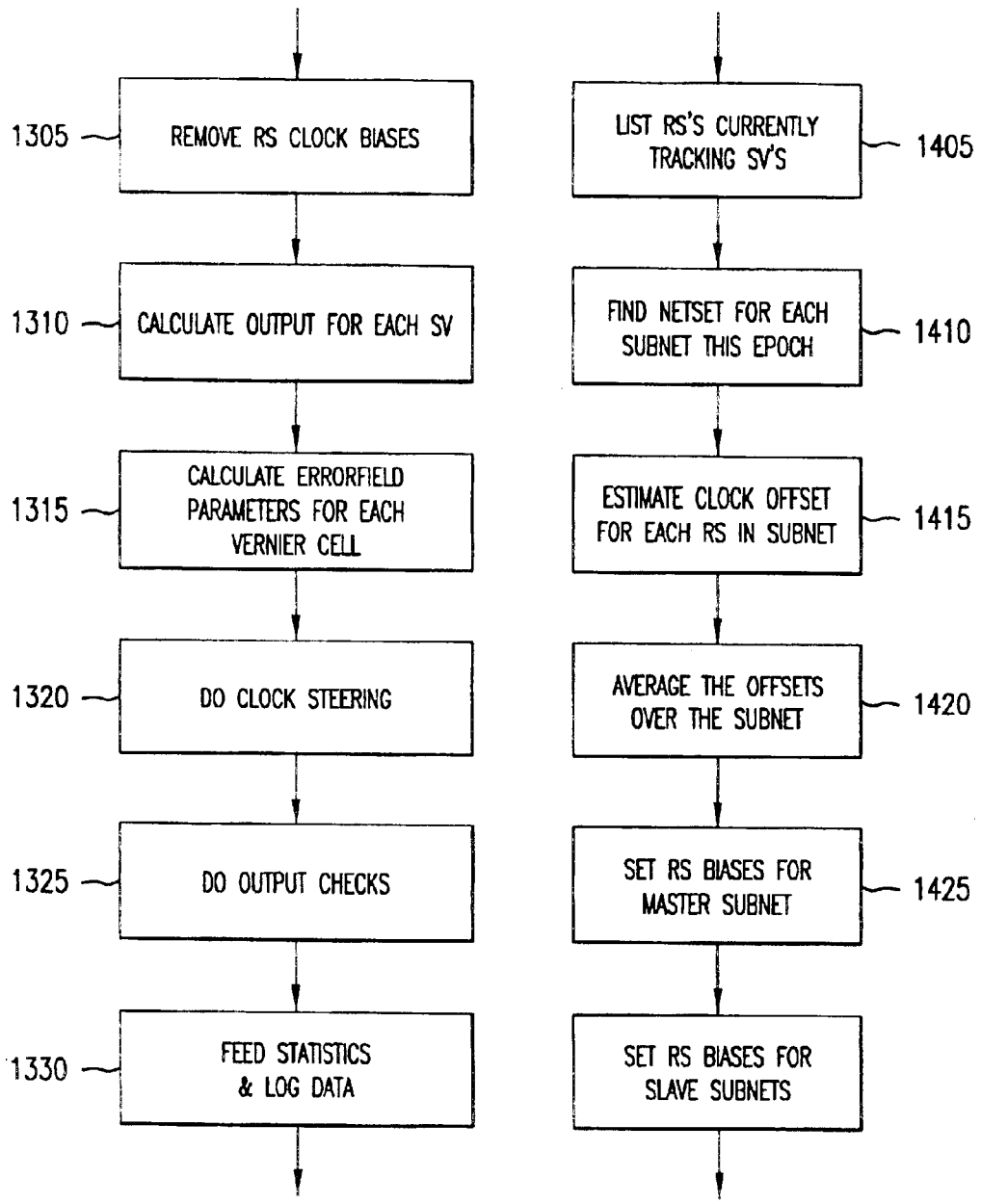

CALCULATE OUTPUT FOR EACH SV 1310

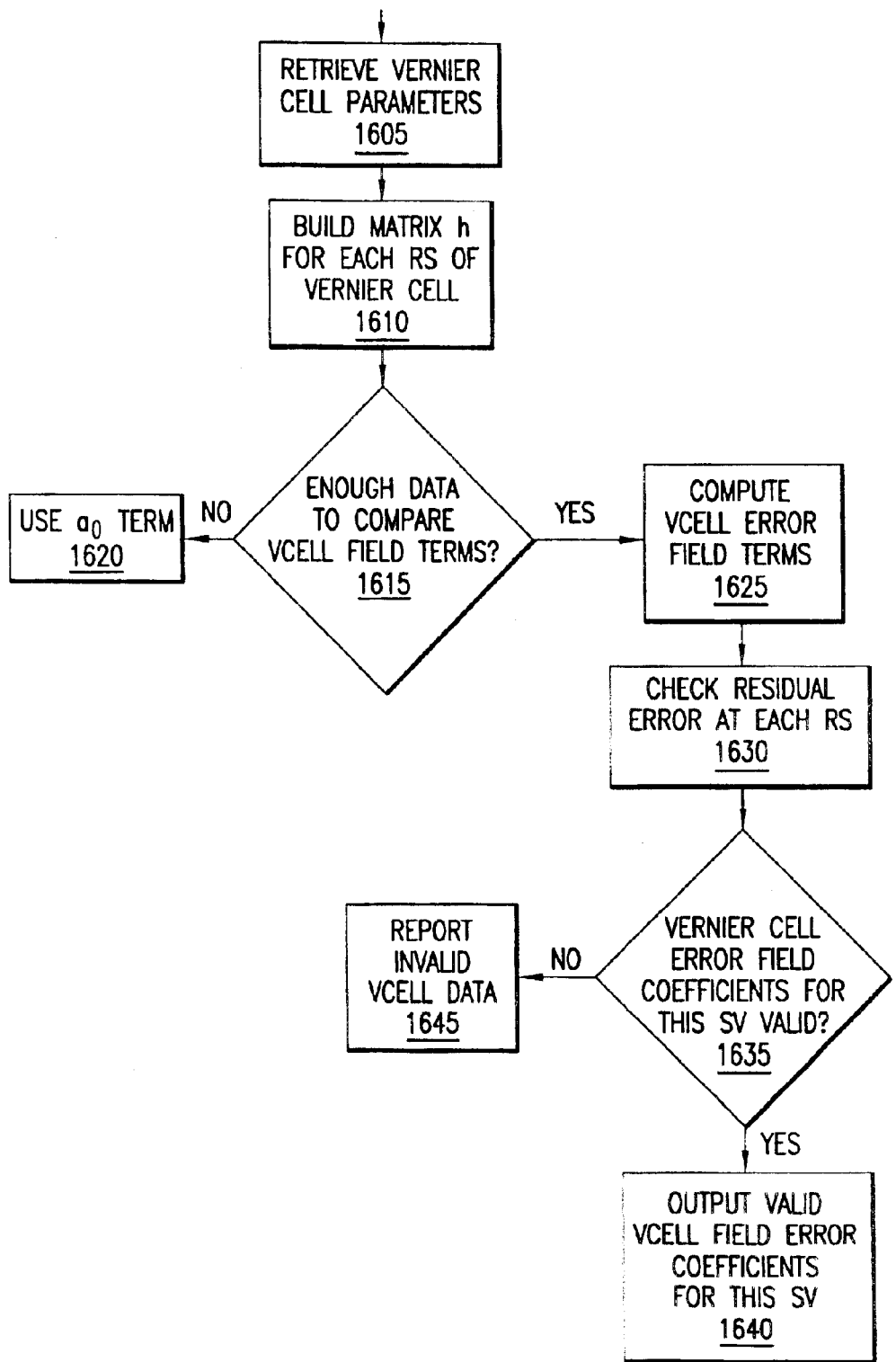
CALCULATE VERNIER CELL ERROR FIELD PARAMETERS 1315    FIG. 16A

INTEGRATED NAVIGATOR MAIN PROCESS

GPS CORRECTION METHODS, APPARATUS AND SIGNALS

RELATED APPLICATIONS

This application is a continuation of co-pending U.S. patent application Ser. No. 09/997,372, filed Nov. 29, 2001, the content of which is incorporated herein by this reference.

BACKGROUND OF THE INVENTION

1. Field of the Invention

The invention relates to global positioning system methods, apparatus and signals, particularly employing corrections enabling performance suitable for code-phase-differential and real-time-kinematic applications.

2. Prior Art

Use of the global positioning system (GPS) to determine position has become commonplace, though the position determination has limitations. A GPS position fix can have an error which arises from a variety of unintended sources and, until recently, from the effect of Selective Availability. These errors can vary over time and with location. Various techniques have been developed to reduce the errors.

One approach is basic Differential GPS (DGPS), in which a fixed reference station at a known location generates corrections for all satellites in view. The corrections are transmitted to a roving GPS receiver, where they are used to remove common-mode errors, i.e., errors common to the reference station and the roving receiver. Residual errors increase as the distance between the roving receiver and the reference station increases, a phenomenon called geographic de-correlation. The amount of degradation of accuracy with distance from the fixed reference station depends on the state of the ionosphere, the troposphere, and errors in calculating satellite position, and can be as much as 1 meter for every 100 km (60 miles).

Another approach is network DGPS, in which four or more reference stations each collect data for all satellites in view at their respective locations. The reference-station data are transmitted to a network central processor which uses the data to determine the errors for each satellite in view. These errors are transmitted to the roving DGPS receiver, which uses these errors to generate corrections applicable to the location of the roving receiver. This capability added to a roving receiver has been termed a "virtual reference station" (VRS) because the result is like having a reference station at the location of the roving receiver. The VRS technique uses the correction data to remove actual satellite errors. Residual errors are essentially constant.

The VRS technique has advantages over a fixed base station. The satellite differential correction signals give corrections which are valid over a wide area. These wide area differential correction signals are used by the VRS to compute a differential correction applicable to the location of the VRS, at any place within the satellite view area. The computed correction is the same as a base station would generate if it were at the user's location. This correction is constantly updated so the corrections remain accurate as the user moves around.

The Wide-Area Augmentation System (WAAS) being deployed in the United States also is intended to provide differential correction signals which are valid over a wide area. One feature of WAAS is that it employs a large Kalman filter to generate differential corrections from measurements taken at the reference stations. This filter addresses many parameters simultaneously, so that it requires more processing power than is desirable.

A limitation of the VRS technique and of WAAS is that the differential correction signals, while valid over a wide area, are still not sufficiently accurate for some purposes. There is a need for GPS methods and apparatus providing greater accuracy, and which can be implemented with modest processing resources such as personal computers.

SUMMARY

Methods and apparatus are described and illustrated for producing GPS corrections, comprising: collecting measurements from a plurality of network reference stations; determining network corrections from the measurements; determining residual errors at one or more vernier-cell reference stations; and preparing vernier-cell corrections to compensate the residual errors within a vernier-cell region.

Network correction streams are described and illustrated which contain network corrections derived from a plurality of network reference stations and residual error corrections derived from one or more vernier-cell reference stations.

Methods and apparatus are described for employing such network correction streams in a virtual reference station to produce corrections and/or virtual measurements for use in a GPS receiver.

Methods and apparatus are described for employing such network correction streams in an integrated navigator to produce corrected position fixes.

These and other features consistent with the invention will become apparent to those of skill in the art from the illustrations and description which follow.

BRIEF DESCRIPTION OF THE DRAWING

FIG. 13 shows in more detail the process epoch operation 920 of FIG. 9A;

FIG. 14 shows in more detail the remove reference-station clock biases operation 1305 of FIG. 13;

FIG. 16A shows in more detail the calculate vernier cell error field parameters operation 1315 of FIG. 13;

DETAILED DESCRIPTION

Figure 1:
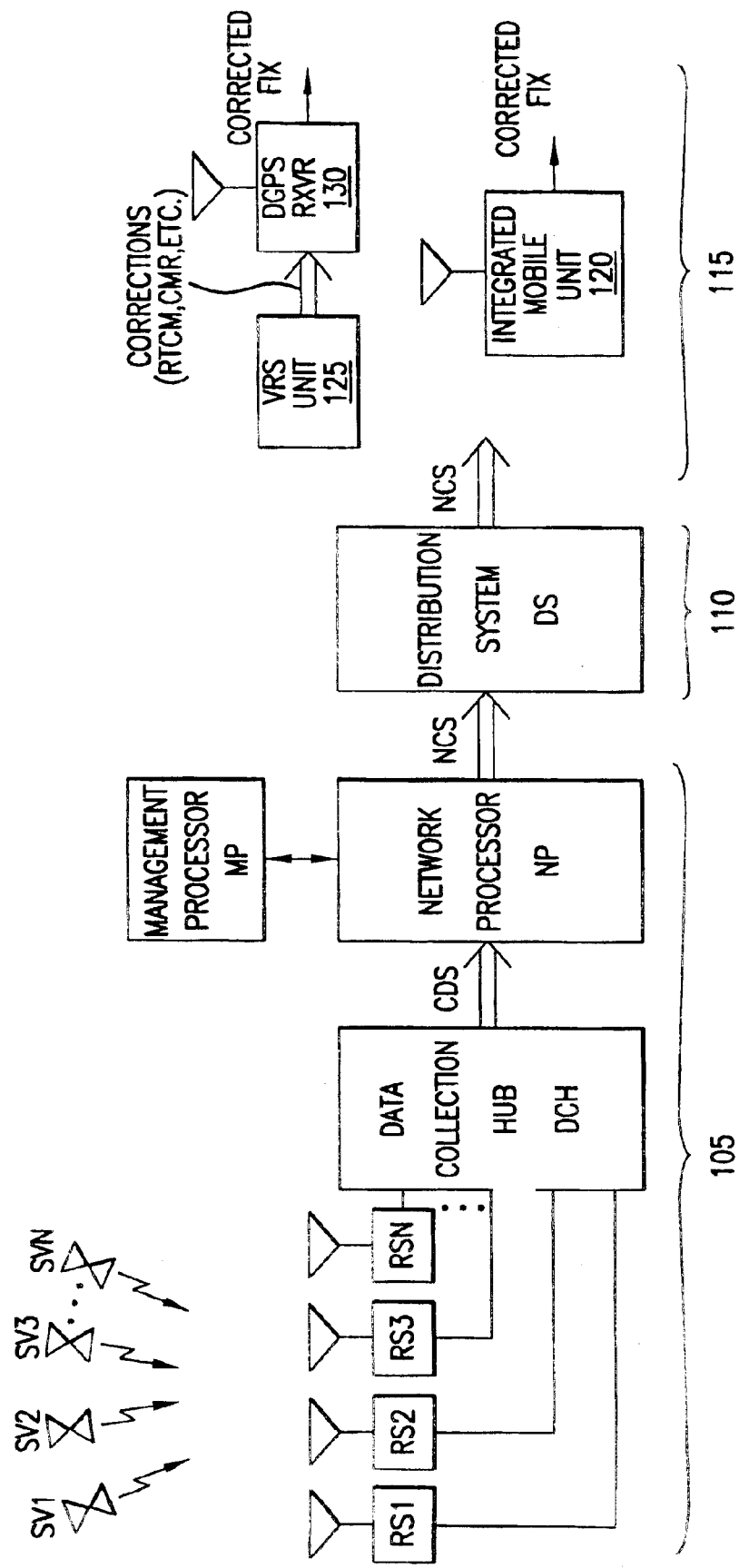
FIG. 1 is a schematic diagram of a system for providing differential correction signals in accordance with preferred embodiments of the invention.

FIG. 1 is a schematic diagram of a system 100 for providing differential correction signals and corrected position fixes in accordance with preferred embodiments of the invention. The system has three major subsystems: (1) infrastructure 105 for generation of correction data from GPS satellite signals, (2) a distribution system 110 of delivery media for real-time distribution of correction data to mobile equipment, and (3) mobile equipment 115.

Infrastructure subsystem 105 comprises a number of reference stations RS1, RS2, RS3, . . . , RSN, a data collection hub DCH, data-transmission channels DT1, DT2, DT3, . . . , DTN communicating data from the reference stations to the data collection hub, and a network processor NP.

The reference stations are preferably geodetic-quality L1/L2 GPS receivers located at sites around the perimeter, at a minimum, of a region of interest. This area can range in size from a small town to worldwide. For example, eight reference station sites might be deployed to provide basic network data and redundancy for a region the size of Japan, the Western United States, Great Britain, Spain or Italy, etc. A reference station can be, for example, a dual-frequency GPS receiver commercially available from Trimble Navigation Limited of Sunnyvale, Calif. USA, with Trimble's RTSurvey streamed data output enabled (e.g., UDP/IP or RS232C serial communication), and a communications device (modem, frame relay, etc.). Data output from each reference station is transmitted to the data collection hub DCH via telephone lines, radio links or other suitable transport media capable of supporting real-time data transmission (e.g.,), preferably at a minimum rate of 9600 baud.

Data collection hub DCH comprises a computer system, such as a personal computer system having a processor, memory, data store, input/output and display devices, an operating system such as Windows NT, and communications devices to receive data from the reference stations RS1–RSN and transmit data to network processor NP. Data collection hub DCH collects data from the reference stations RS1–RSN and produces a composite data stream CDS which is formatted for transfer to network processor NP.

Network processor NP comprises a computer system, such as a personal computer system having a processor, memory, data store, input/output and display devices, an operating system such as Windows NT, and communications devices to receive the composite data stream from data collection hub DCH and transmit a network-correction data stream NCS to the distribution system. Network processor NP processes composite data stream CDS to produce the network-correction stream NCS which is supplied to data distribution system 110. Network processor NP, or an optional management processor MP in communication with network processor NP, can be used for further activities such as file generation, file transfer, bulletin-board services, etc.

Data collection hub DCH and network processor NP can be collocated at a site having reliable infrastructure, such as shelter and power. Data collection hub DCH and network processor NP are described in this embodiment as comprising two separate personal computers, but their functions as described herein can be performed by any number of other arrangements including a single computer or multiple computers. Portions of the processing (such as calculation of vernier cell error-field parameters, discussed below) could be done in one or more vernier-cell processors, though a Pentium III personal computer should be adequate to handle the main network processing as well as the vernier-cell processing for a network having multiple vernier cells.

Network processor NP receives data from all reference stations in the composite data stream CDS and uses these data to estimate errors in the satellite ephemerides and clock polynomials broadcast by the GPS satellites. These errors are used along with modeled tropospheric and ionospheric delays to calculate corrections for pseudorange and delta-range made by the GPS receiver at the mobile equipment 115. Before transmission from the network processor NP, corrections for each satellite are tested against measurements from all reference stations tracking that satellite. If the residuals from that test are not satisfactory, the worst reference station is excluded, and the calculations are repeated without the excluded reference station. This process is iterated until either satisfactory correction data are obtained or the satellite is declared unusable. Warnings for satellites declared unusable can be transmitted in the NCS along with correction data for usable satellites for each epoch.

The rate of change of the corrections is checked against the output intervals to exclude measurements from a failing satellite or downgrade the variance of the correction. Thus, faulty reference stations, faulty measurements, and faulty GPS satellites are removed from the process automatically at each measurement epoch. Warnings for satellites removed in this manner are transmitted by the network processor along with correction data for usable satellites for each epoch.

The measurement and computation epochs and latencies of the GPS reference network as described thus far have been found to support a 20–30 cm level of accuracy for real-time positioning and navigation with Selective Availability in effect. The network algorithms remove most of the temporal de-correlation in GPS measurements. Temporal de-correlation is managed by minimizing latency of the corrections. Thus the major sources of error at the mobile equipment are multipath signals and receiver noise.

Multipath can be controlled at the reference stations and at the mobile equipment by prudent siting of the GPS receiving antenna with respect to obvious reflecting surfaces, good antenna design, and multipath mitigation techniques within the GPS receiver. A high-quality, precision GPS receiver makes low-noise measurements of the GPS code and carrier phases.

The distribution system DS comprises delivery media for real-time distribution of DGPS data to mobile users, such as satellite, FM sub-carrier, GSM telephone, VHF/UHF and/or any others capable of supporting data transfer at a rate of, for example, 120 bits per second or better. An unbuffered data distribution system 110 for the network correction stream NCS produces minimum latency. The GSM mobile telephone network in the United Kingdom supports data transmissions at 9600 baud and can be used for DGPS operations. Another technology becoming available which supports the broadcast (point to multipoint) of the network DGPS information is Digital Audio Broadcasting (DAB). These and other distribution channels may be used.

The update rate and latency are largely determined by the desired position-fix accuracy and bandwidth of the available data-distribution channel. More frequent updates and minimum distribution latency enable greater accuracy. For example, an update rate on the order of 1 second is feasible with a 2400-baud data-distribution channel, while an update rate of 5 seconds is feasible with a 120-baud data-distribution channel. An update rate of 0.6 seconds or multiples thereof can be used for optimum compatibility with RTCM, as the least significant bit in the RTCM time tag is 0.6 seconds.

The mobile equipment 115 performs two functions. The first is to receive the broadcast network correction stream NCS and turn this into a set of corrections, e.g., in RTCM or other format, appropriate for a declared location. The declared location can be, for example, the current location of a mobile unit or a fixed location such as an airport runway threshold. The declared location can be provided from a GPS fix determined at the mobile unit or can be supplied by user input. A mobile unit thus has a functionality equivalent to having a reference station at the current location of the mobile unit or at a declared location near the mobile unit—this Virtual Reference Station (VRS) functionality eliminates the effects of spatial de-correlation.

The second function of mobile equipment 115 is generation and output of a corrected position and velocity solution for the current location of the mobile unit. This can be done, for example, by any receiver capable of accepting standard RTCM SC-1044 correction inputs, though precision of solution is dependent on receiver quality.

Mobile equipment 115 can be implemented in various ways, including:

A fully integrated mobile receiver 120 (including a network data link, VRS functionality and an L1 GPS receiver with DGPS or RTK/OTF capability as appropriate to the application) capable of using the correction data to produce the solution directly. Of course, if the mobile equipment is implemented as a fully integrated mobile receiver, it can use the correction data directly and need not produce an RTCM or other formatted correction stream. An example of such an integrated mobile receiver is the AgGPS 132 receiver supplied commercially by Trimble Navigation Limited. The Trimble AgGPS 132 receiver has built-in data receivers for L-band satellite transmissions and 300 kHz marine radio beacon transmissions.

An L1 receiver (DGPS or RTK as appropriate to the application) with embedded VRS functionality and which receives the network-correction-stream data from an appropriate data link receiver. The DSM 21/212 family of DGPS receivers supplied commercially by Trimble Navigation Limited have such functionality, and can be employed with a suitable data link, e.g., a GSM telephone/modem.

A dual-frequency mobile receiver that can function in both DGPS and RTK modes, as required.

VRS functionality implemented in a separate data-link receiver unit 125 that produces local equivalents of RTCM SC-104 or other format DGPS correction data for input to any compatible GPS receiver 130 having DGPS functionality, or local equivalents of RTK or CMR correction data for input to any compatible GPS receiver with RTK/OTF functionality.

Trimble network navigator software running on a portable personal computer (e.g., a PC running MS Windows NT) that receives the network-correction-stream data using an appropriate data link receiver. If the navigator software is provided with an RT-17 stream of raw measurements from a GPS receiver, it can use this stream with the NCS correction data to compute a corrected position fix and velocity. The navigator software can also function as a VRS to provide the set of local-equivalent RTCM SC-104 format DGPS corrections to any compatible GPS receiver with DGPS functionality or local equivalents of RTK or CMR virtual measurement data for input to any compatible GPS receiver with RTK/OTF functionality.

Figure 2:
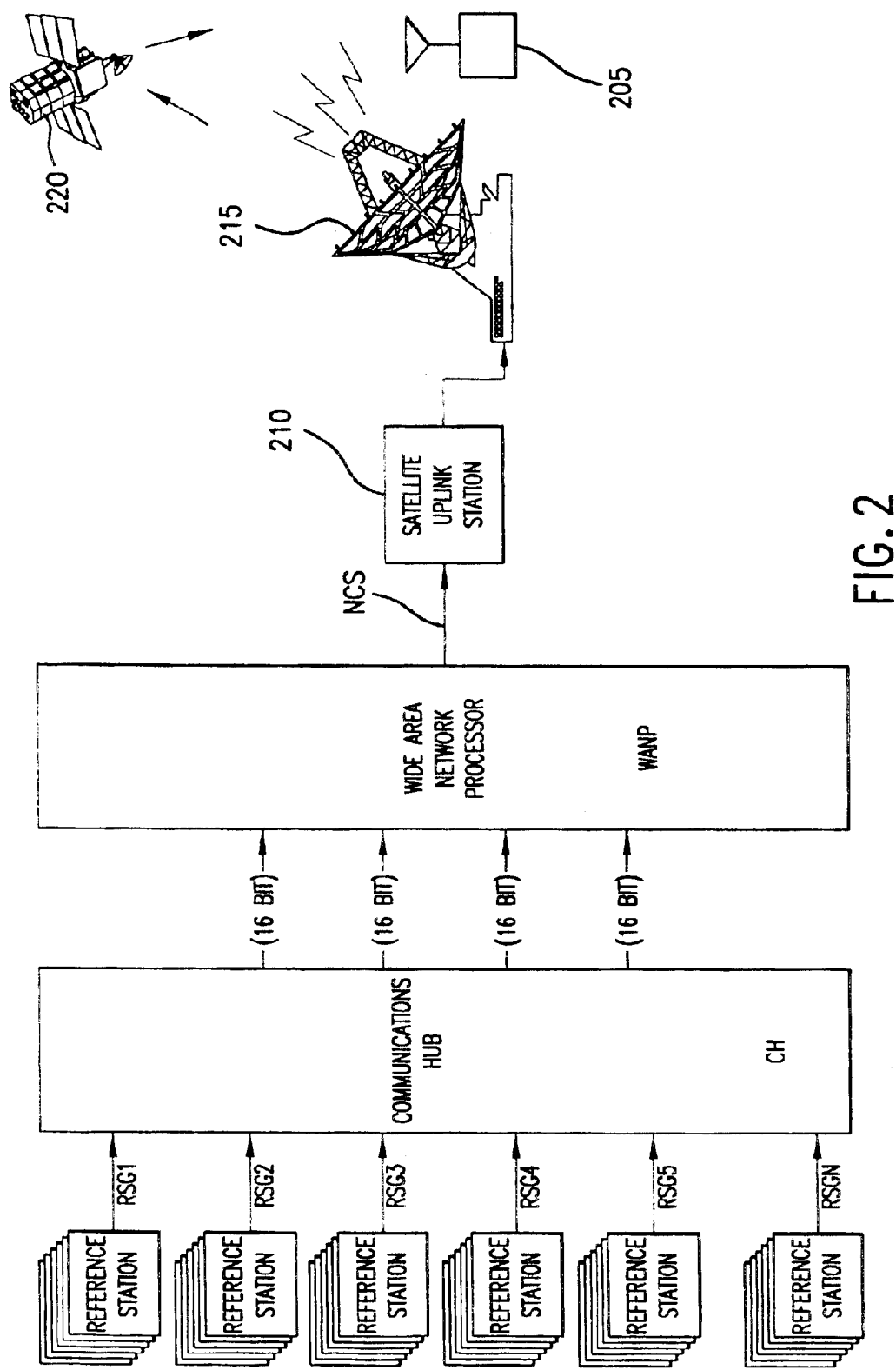
FIG. 2 is a schematic diagram of a system for providing differential correction signals in accordance with further preferred embodiments of the invention.
Figure 3:
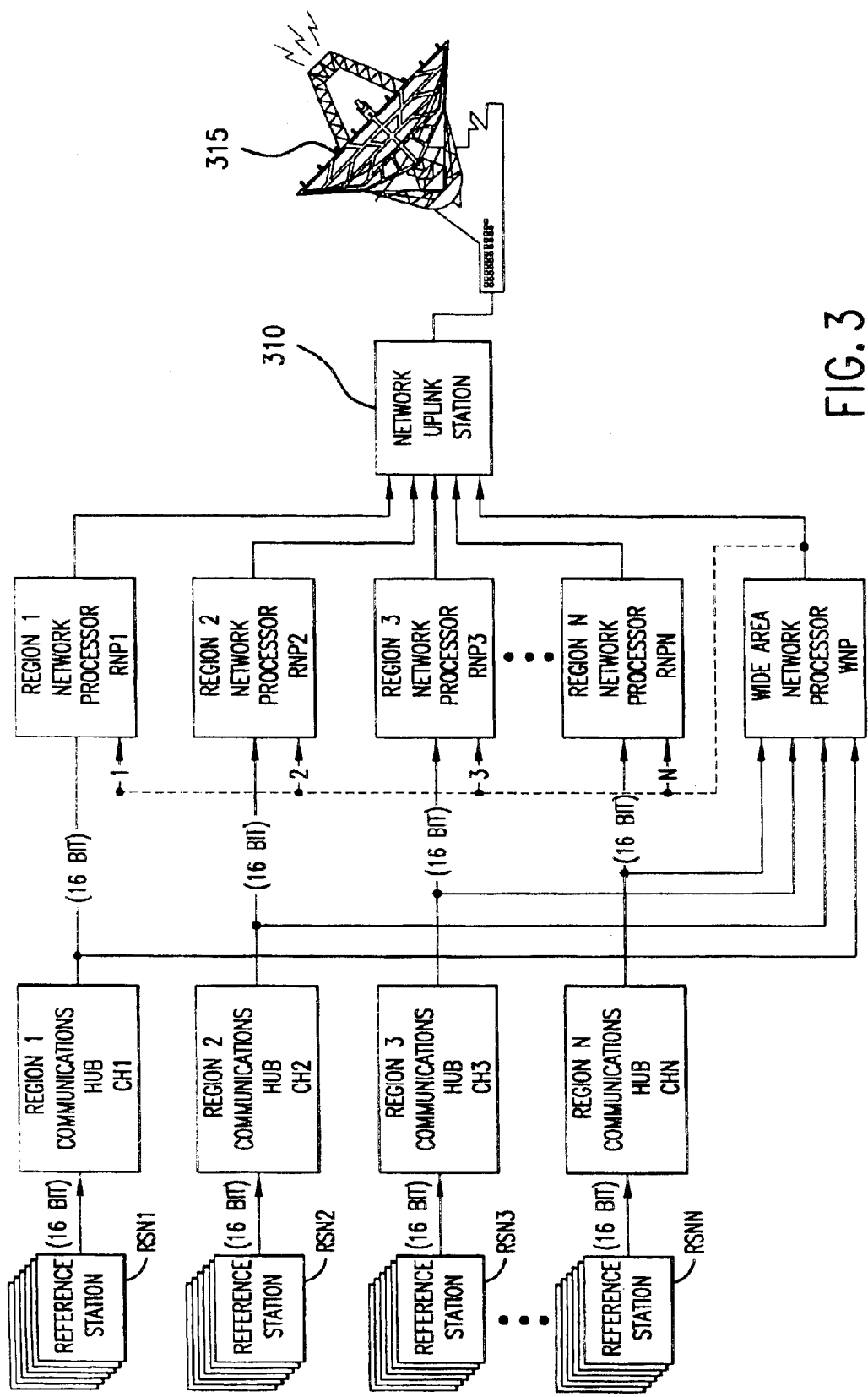
FIG. 3 is a schematic diagram of a system for providing differential correction signals in accordance with still further preferred embodiments of the invention.

Reference stations can be organized in a global network feeding a single communications hub as shown in FIG. 1, or can be arranged in smaller groups as shown for example in FIGS. 2 and 3. FIG. 2 shows a system having groups of reference stations RSG1, RSG2, RSG3, RSG4, RSG5, RSGN arranged in a global network. Data from these reference stations are fed to a communications hub CH via suitable data links. The data are then passed to a wide-area network processor WANP which performs the network processor functions to produce a network correction stream NCS. The NCS is passed by a suitable distribution system to the roving receivers. In FIG. 2, the NCS is relayed to mobile equipment such as mobile unit 205 via a distribution system including at least one satellite uplink station 210 with antenna 215, and at least one signal-distribution satellite 220.

FIG. 3 shows an arrangement in which the reference stations are organized in a plurality of regional subnets such as regional subnets RSN1, RSN2, RSN3, . . . , RSNN. In this example, each regional subnet has a respective data collection hub such as data collection hubs CH1, CH2, CH3, . . . , CHN, and a regional network processor such as regional network processors RNP1, RNP2, RNP3, . . . RNPN. In the embodiment of FIG. 3, each reference station feeds data via a data collection hub to a network processor of its regional subnet as well as to a wide-area network processor WNP. The regional network processors receive data from the wide-area network processor to further enhance accuracy of correction signals. The corrections data is relayed to mobile equipment via at least one satellite uplink station 310 and antenna 315.

Figure 4:
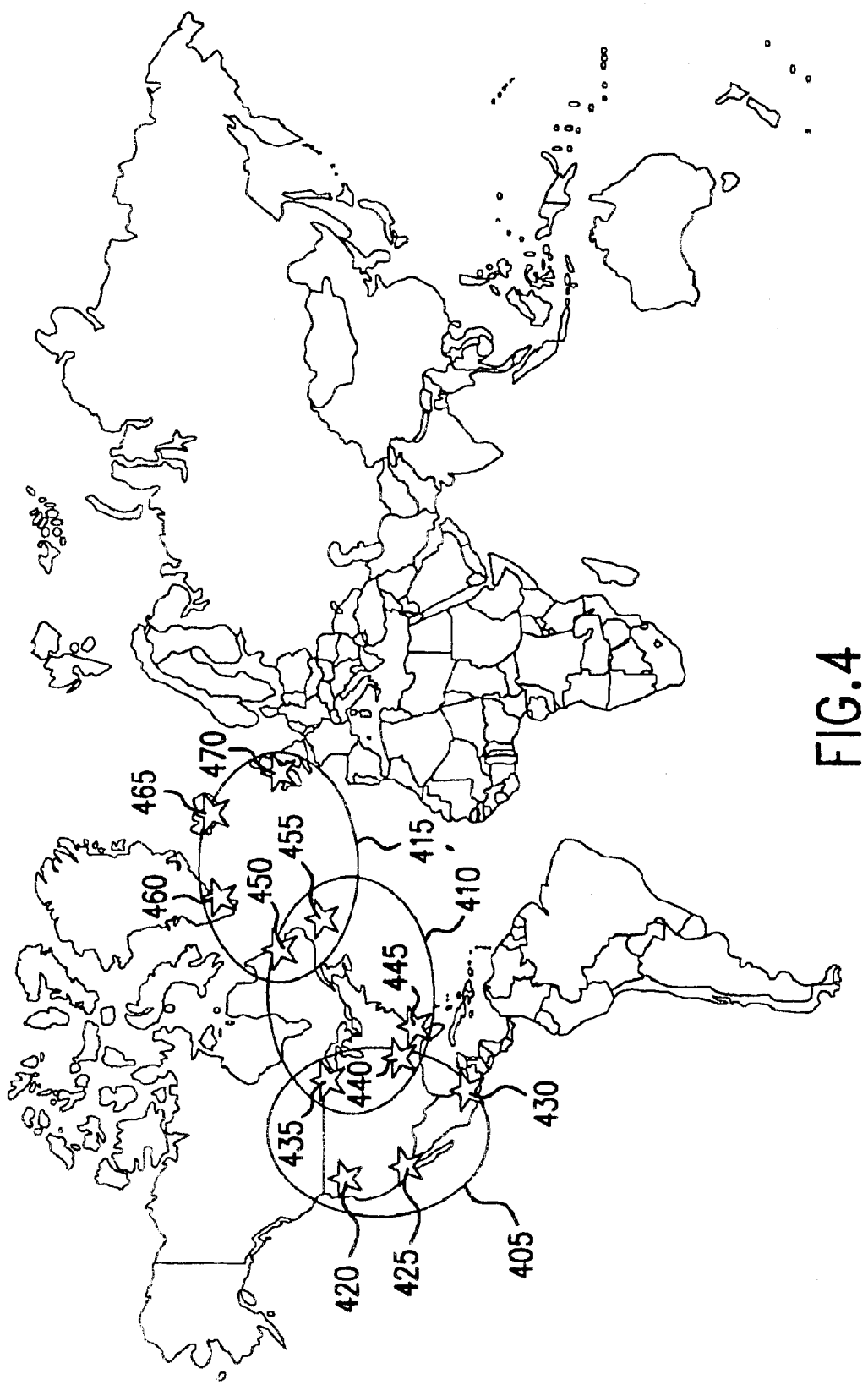
FIG. 4 illustrates the use of subnets as employed in embodiments of the invention.

FIG. 4 shows an arrangement of three regional subnets 405, 410 and 415 in which some overlap is provided so that some reference stations participate in more than one of the regional subnets. For example, regional subnet 405 includes reference stations 420, 425, 430, 435 and 440, regional subnet 410 includes reference stations 435, 440 445, 450 and 455, and regional subnet 415 includes reference stations 450, 455, 460, 465 and 470. The reference stations can be networked as shown in any of FIGS. 1–3 or in suitable variations of the arrangements shown.

The DGPS networks as described thus far can be upgraded in accordance with embodiments of the invention to provide increased accuracy over regions of particular interest. That is, density of the network is increased in the regions of interest (also called "vernier cells" in the description below) to provide reduced spacing between reference stations.

Figure 5:
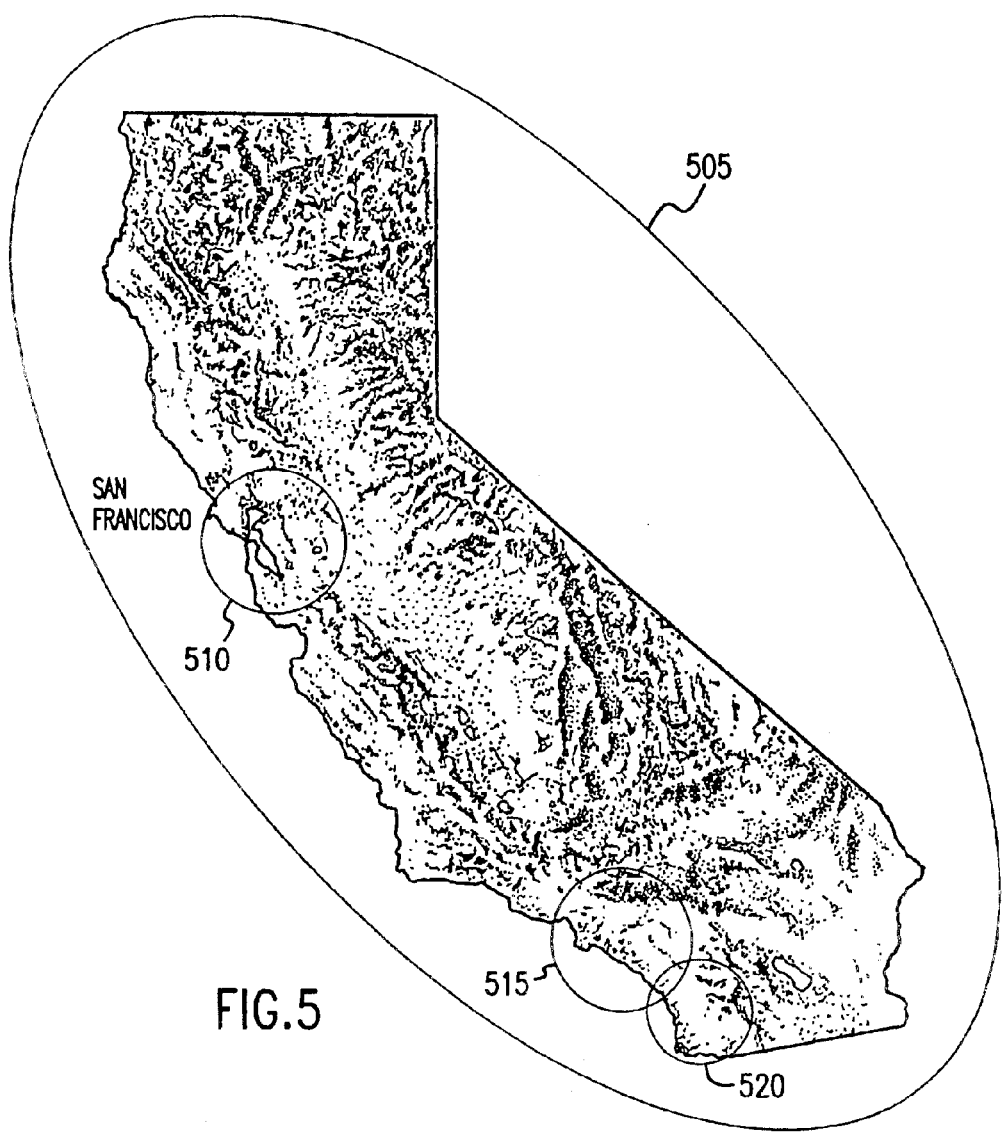
FIG. 5 illustrates the use of vernier cells in accordance with embodiments of the invention.

Consider the network of FIG. 4 having reference stations to provide measurements over the continental United States and north Atlantic Ocean. This configuration provides for time synchronization among subnets which do not have common GPS satellite visibility. Reference stations can be added to provide greater network density in regions where higher accuracy is desired. For example, FIG. 5 shows a region 505 encompassing the state of California over which the density of reference stations (not shown) is increased relative to the density of reference stations outside California in the network of FIG. 4. FIG. 5 also shows regions of still greater reference-station density, such as the San Francisco Bay region 510, the Los Angeles region 515, and the San Diego region 520. Regions of interest can overlap as desired, such as regions 515 and 520 which overlap with one another and with region 505. The manner in which measurements from the reference stations are used in accordance with the invention is illustrated in embodiments described below.

Operation of the network to produce the composite data stream CDS and the network correction stream NCS, and use of the NCS by the mobile equipment, can be implemented in suitable computer software. Flow charts will now be described which show operating principles of the software. The software can be in any suitable language, for example in an object-oriented language such as C++.

Figure 6:
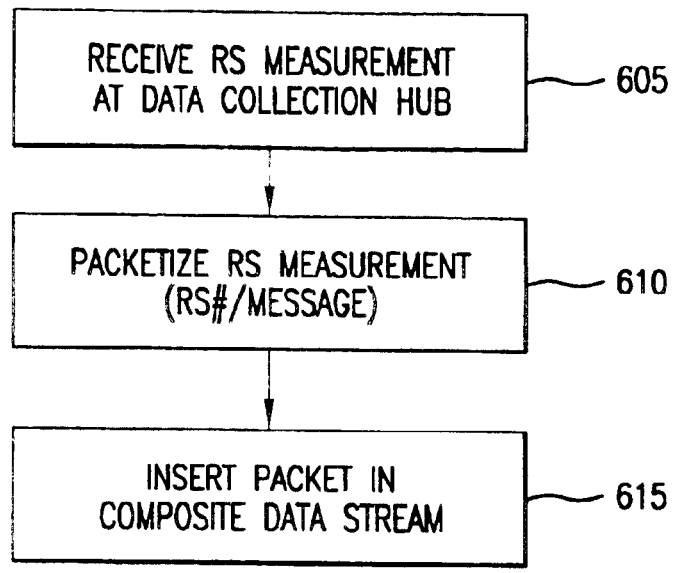
FIG. 6 is a flow chart illustrating preparation of a composite data stream in accordance with embodiments of the invention.

FIG. 6 is a flow chart illustrating preparation of a composite data stream in accordance with embodiments of the invention. As shown at operation 605, data are received from the reference stations at the data collection hub DCH. The data from each reference station include messages from the GPS satellites and measurements made at the reference station. At 610, the data from the reference stations are prepared for transmission, e.g., by preparing data packets which identify the reference station and message type and which include data appropriate to the message type. The message types are, e.g., (i) measurements such as pseudorange PR and phase φ for each of the L1 and L2 frequencies for each satellite in view at the reference station, typically at a rate of ~1 Hz, (ii) ephemerides for each satellite in view at the reference station, typically once each two hours, and (iii) iono parameters and time parameters, which are provided sporadically. At 615, the data collection hub DCH inserts the messages in the composite data stream CDS which is transmitted to the network processor NP.

The network processor receives the CDS and uses its data to produce the network correction stream NCS. The NCS is transmitted, for example, as a stream of packetized messages. Table A shows one possible format for NCS messages, including a packet header, a data payload, and a packet tail.

TABLE A

NCS Message Packet Format

|  | bits | lsb | max value |
|---|---|---|---|
| packet header: |  |  |  |
| preamble | 8 |  |  |
| stream ID | 8 | 1 | 255 |
| message type | 8 | 1 | 255 |
| data length (bits) | 8 | 8 | 2040 |
| seconds of week (seconds) | 24 | 0.0625 | 1048576 |
| <data> |  |  |  |
| packet tail: |  |  |  |
| checksum | 8 |  |  |
| postamble | 8 |  |  |
| Header Bits | 56 |  |  |
| Header Bytes | 7 |  |  |
| Tail Bits | 16 |  |  |
| Tail Bytes | 2 |  |  |
| Wrapper bits | 72 |  |  |
| Wrapper bytes | 9 |  |  |

NCS messages can be of various types. For example, Tables B–F show possible formats for NCS message types 1–5. As shown in Table B, Message Type 1 carries satellite clock error data, including identification of the satellite (svID) issue of data ephemeris (iode, which keys the clock error data to the ephemeris data being broadcast by the satellite), and satellite clock correction data.

TABLE B

NCS Message Type 1

| Type 1 | bits | lsb | max value |
|---|---|---|---|
| Satellite Clock Correction Message Element: |  |  |  |
| svID | 5 | 1 | 31 |
| quality | 3 | 1 | 7 |
| iode | 8 |  |  |
| clock | 24 | 0.001 | 8388.607 meters |
| nbits | 40 |  |  |
| nbytes | 5 |  |  |
| Satellite Clock Correction Message: |  |  |  |
| nSVs | 12 | 18 | 31 |
| wrapper | 72 | 72 | 72 |
| sub-message bits | 480 | 720 | 1240 |
| bits/message | 552 | 792 | 1312 |
| bytes/message | 69 | 99 | 164 |

Message Type 2 carries satellite position error data representing the difference between (1) the satellite position as calculated from the ephemeris data supplied by the satellite and (2) the satellite position as determined by the network processor from data supplied by the reference stations. The message includes the satellite identification (svID), an indicator of quality of correction (quality), issue of data ephemeris (iode), position error in x, y and z, and other data as indicated in Table C.

TABLE C

NCS Message Type 2

| Type 2 | bits | lsb | max value |
|---|---|---|---|
| Satellite Position Correction Message Element: | | | |
| svID | 5 | 1 | 31 |
| quality | 3 | 1 | 7 |
| iode | 8 | | |
| ex (meters) | 16 | 0.001 | 32.767 |
| ey (meters) | 16 | 0.001 | 32.767 |
| ez (meters) | 16 | 0.001 | 32.767 |
| nbits | 64 | | |
| nbytes | 8 | | |
| Satellite Position Correction Message: | | | |
| nSVs | 12 | 18 | 31 |
| wrapper | 72 | 72 | 72 |
| sub-message bits | 768 | 1152 | 1984 |
| bits/message | 840 | 1224 | 2056 |
| bytes/message | 105 | 153 | 257 |

Message Type 3 carries vernier cell corrections as shown for example in Table D. To allow for multiple vernier cells, the message includes an identification of the vernier cell (vernierID), the radius of effectiveness (range) around its geographic center, the geographic center (x0,y0,z0), and satellite-error-field corrections applicable within the defined range of the vernier cell. As the vernier cells are geographically limited, their correction data are only useful within the defined range. Other arrangements for describing the boundaries of a vernier cell may also be used if desired, e.g., to provide for more complex vernier cell shapes.

TABLE D

NCS Message Type 3

| Type 3 | bits | lsb | max value |
|---|---|---|---|
| Vernier Reference | | | |
| Vernier ID | 4 | 1 | 16 |
| range | 4 | $10^5$ | note 1 meters |
| x0 | 16 | 200 | 6553400 meters |
| y0 | 16 | 200 | 6553400 meters |
| z0 | 16 | 200 | 6553400 meters |
| nbits | 56 | | |
| nbytes | 7 | | |
| Satellite Error Field Correction | | | |
| svID | 5 | 1 | 31 |
| quality | 3 | 1 | 7 |
| iode | 8 | | |
| a0 | 16 | 0.001 | 32.767 meters |
| a1 | 16 | 0.00001 | 0.32767 meters/kilometer |
| a2 | 16 | 0.00001 | 0.32767 meters/kilometer |
| nbits | 64 | | |
| nbytes | 8 | | |
| Satellite Vernier Correction Message: | | | |
| nSVs | 12 | | |
| wrapper | 72 | | |

TABLE D-continued

NCS Message Type 3

| Type 3 | bits | lsb | max value |
|---|---|---|---|
| Vernier Reference | 56 | | |
| sub-message bits | 768 | | |
| bits/message | 896 | | |
| bytes/message | 112 | | | note 1: zero is interpreted as 0x2F * lsb to get a large max range

The global network uses as many reference stations as desired, e.g., all reference stations which are supplying usable data. However, a vernier cell uses reference stations within a defined region, e.g., San Francisco Bay area. Vernier cells can overlap, e.g., one for the state of California, one each for the San Francisco Bay area, for the Los Angeles area, and for the San Diego area. If the specified location for which corrections are to be determined is within a region where multiple vernier cells overlap, it is preferred for the mobile equipment to use the corrections from the vernier cell which has smaller radius because its corrections will be sharper and more precise.

Referring for example to FIG. 5, a mobile unit located outside of California can use global network correction data from the NCS when it is located outside California, and supplement this with vernier correction data of the California vernier cell when in California. When entering SF Bay area, the mobile unit has two overlapping vernier cells available for use: the larger vernier cell 505 is effective for California and the smaller 510 is effective for the San Francisco Bay area. The mobile unit preferably uses data from the smaller vernier cell, e.g., when in the San Francisco Bay area it uses the vernier cell data for the San Francisco Bay area. Similarly, when in the region of overlap between vernier cells 515 and 520, the mobile unit preferably uses the correction data from the vernier cell 520 of smaller radius. This is useful for example for an aircraft which needs less precise GPS fixes when en route and more precise fixes when entering congested airspace (California) and still more precise fixes when approaching to land (San Francisco Bay area). Data from a given reference station may contribute to the corrections of the global network and also to the corrections of multiple vernier cells, e.g., to the California vernier cell and to the SF Bay area vernier cell.

The Type 4 NCS message includes iono parameters which can be the same as those broadcast by the GPS satellites in their nav messages. These can be modified, and improved, when using two-frequency measurements (L1 and L2) at the reference stations. These iono parameters are sent in the NCS so that they can be used by any GPS receiver having capability to use them. The iono parameters alpha0, alpha1, alpha2, etc., and their scalings are, e.g., in the format defined in the GPS ICD-200 specification as broadcast by the GPS satellites. Additional iono parameters can be added if desired; for example, the GPS ICD-200 specification takes the iono to be constant at night time, so the network processor can supply a value in the NCS which is used to adjust this constant, e.g., a night level parameter. The Type 4 NCS message can also include parameters for a troposphere model, e.g., parameters of delta refractivity and delta scale height for an exponential model. Table E shows an example of parameters in a Type 4 NCS message.

TABLE E

Type 4 NCS Message

| Type 4 | bits | log2 lsb | max value | |
|---|---|---|---|---|
| Iono Parameters: | | | | |
| alpha0 | 8 | −30 | 1.18278E−07 | |
| alpha1 | 8 | −27 | 9.46224E−07 | |
| alpha2 | 8 | −24 | 7.56979E−06 | |
| alpha3 | 8 | −24 | 7.56979E−06 | |
| beta0 | 8 | 11 | 260096 | |
| beta1 | 8 | 14 | 2080768 | |
| beta2 | 8 | 16 | 8323072 | |
| beta3 | 8 | 16 | 8323072 | |
| night level | 8 | −30 | 1.18278E−07 | |
| Delta Refractivity SL | 8 | −18 | 0.000484467 | Sea-level atmospheric refractivity |
| Delta Scale Height | 8 | 6 | 8128 | Scale height (meters) for tropospheric model. |

TABLE E-continued

Type 4 NCS Message

| Type 4 | bits | log2 lsb | max value | |
|---|---|---|---|---|
| nbits | 88 | | | max tdz 3.937744141 |
| nbytes | 11 | | | nominal tdz 2.208 nominal refractivity nominal scale height |
| Iono Message | | | | |
| wrapper | 72 | | | |
| iono bits | 88 | | | |
| bits/message | 160 | | | |
| bytes/message | 20 | | | |

The Type 5 NCS message contains the satellite ephemeris data, as shown for example in Table F.

TABLE F

Type 5 NCS Message

| Type 5 | bits | log 2 lsb | max value | per GPS | SPS Signal Specification |
|---|---|---|---|---|---|
| Satellite Ephemeris Element: | | | | | |
| svID | 8 | 0 | 255 | | |
| week | 16 | 0 | 65535 | week | |
| tGD | 8 | −31 | 5.9139E−08 | seconds | 2's complement |
| iodc | 16 | 0 | 65535 | | |
| toc | 16 | 4 | 1048560 | seconds | |
| af2 | 8 | −55 | 3.52496E−15 | sec/sec^2 | 2's complement |
| af1 | 16 | −43 | 3.72518E−09 | sec/sec | 2's complement |
| af0 | 24 | −31 | 0.00390625 | sec | 2's complement |
| iode | 8 | 0 | 255 | | |
| Crs | 16 | −5 | 1023.96875 | meters | 2's complement |
| delta n | 16 | −43 | 3.72518E−09 | sc/sec | 2's complement |
| M0 | 32 | −31 | 1 | sc | 2's complement |
| Cuc | 16 | −29 | 6.10333E−05 | radians | 2's complement |
| e | 32 | −33 | 0.5 | dimensionless | |
| Cus | 16 | −29 | 6.10333E−05 | radians | 2's complement |
| (A)^½ | 32 | −19 | 8191.999998 | meters^.5 | |
| toe | 16 | 4 | 1048560 | seconds | |
| Cic | 16 | −29 | 6.10333E−05 | radians | 2's complement |
| OMEGA0 | 32 | −31 | 1 | sc | 2's complement |
| Cis | 16 | −29 | 6.10333E−05 | radians | 2's complement |
| i0 | 32 | −31 | 1 | sc | 2's complement |
| Crc | 16 | −5 | 1023.96875 | meters | 2's complement |
| omega | 32 | −31 | 1 | sc | 2's complement |
| OMEGADOT | 24 | −43 | 9.53674E−07 | sc/sec | 2's complement |
| IDOT | 16 | −43 | 3.72518E−09 | sc/sec | 2's complement |
| bits/sv | 480 | | | | |
| bytes/sv | 60 | | | | |
| Satellite Ephemeris Message: | | | | | |
| nSVs | 4 | | | | |
| wrapper | 72 | | | | |
| ephemeris bits | 1920 | | | | |
| bits/message | 1992 | | | | |
| bytes/message | 249 | | | | |

The ephemerides and their scalings in the Type 5 NCS message are preferably in the format defined in the GPS ICD-200 specification as broadcast by the GPS satellites. The NCS Type 5 message thus allows a VRS to convert the NCS to a RTCM correction stream without being in contact with any GPS satellites. If the NCS is to be used solely by GPS receivers having integrated VRS capability, the Type 5 message need not be included (or if included may be ignored by such receivers), as this data is independently obtained by each GPS receiver directly from the GPS satellites.

Each Type 5 message contains the issue of data ephemeris (iode, a key identifying the data being broadcast by the satellite). When a satellite changes its page, the iode also changes. Mobile equipment using the NCS can compare the iode contained in the NCS message with the iode contained in signals being received directly from a satellite to determine whether a given set of NCS correction data is still valid or has become stale. The Type 5 NCS message also includes satellite clock error data.

Table G shows exemplary NCS bit rates.

TABLE G

Exemplary NCS Bit Rates

| | sub unit bits | sub-header bits | wrapper bits | |
|---|---|---|---|---|
| clock | 40 | | 72 | |
| position | 64 | | 72 | |
| sv vernier | 64 | 56 | 72 | |
| iono tropo | 88 | | 72 | |
| ephemeris | 480 | | 72 | |
| Message Size: | | | | |
| nsvs | 12 | 18 | 24 | |
| clock | 552 | 792 | 1032 | |
| position | 840 | 1224 | 1608 | |
| sv vernier | 896 | 896 | 896 | *12 svs per cell |
| iono tropo | 160 | 160 | 160 | |
| ephemeris | 1992 | 1992 | 1992 | *4 svs per message |

| | repetition interval | repetitions per eph. cycle |
|---|---|---|
| clock | 1 | 180 |
| position | 30 | 6 |
| sv vernier | 30 | 6 |
| iono tropo | 60 | 3 |
| ephemeris | 180 | 1 |
| nVerniers | 1 | |

Bits/eph cycle:

| | | | | Percent of Total Message | | |
|---|---|---|---|---|---|---|
| nsv | 12 | 18 | 24 | 12 | 18 | 24 |
| clock | 99360 | 142560 | 185760 | 85.48 | 86.53 | 87.12 |
| position | 5040 | 7344 | 9648 | 4.34 | 4.46 | 4.52 |
| sv vernier | 5376 | 5376 | 5376 | 4.63 | 3.26 | 2.52 |
| iono tropo | 480 | 480 | 480 | 0.41 | 0.29 | 0.23 |
| ephemeris | 5976 | 9000 | 11952 | 5.14 | 5.46 | 5.61 |
| total | 116232 | 164760 | 213216 | 100 | 100 | 100 |
| bit rate | 645.73 | 915.33 | 1184.53 | | | |
| bit rate loaded 8/5 | 1033 | 1465 | 1895 | | | |

Figure 7:
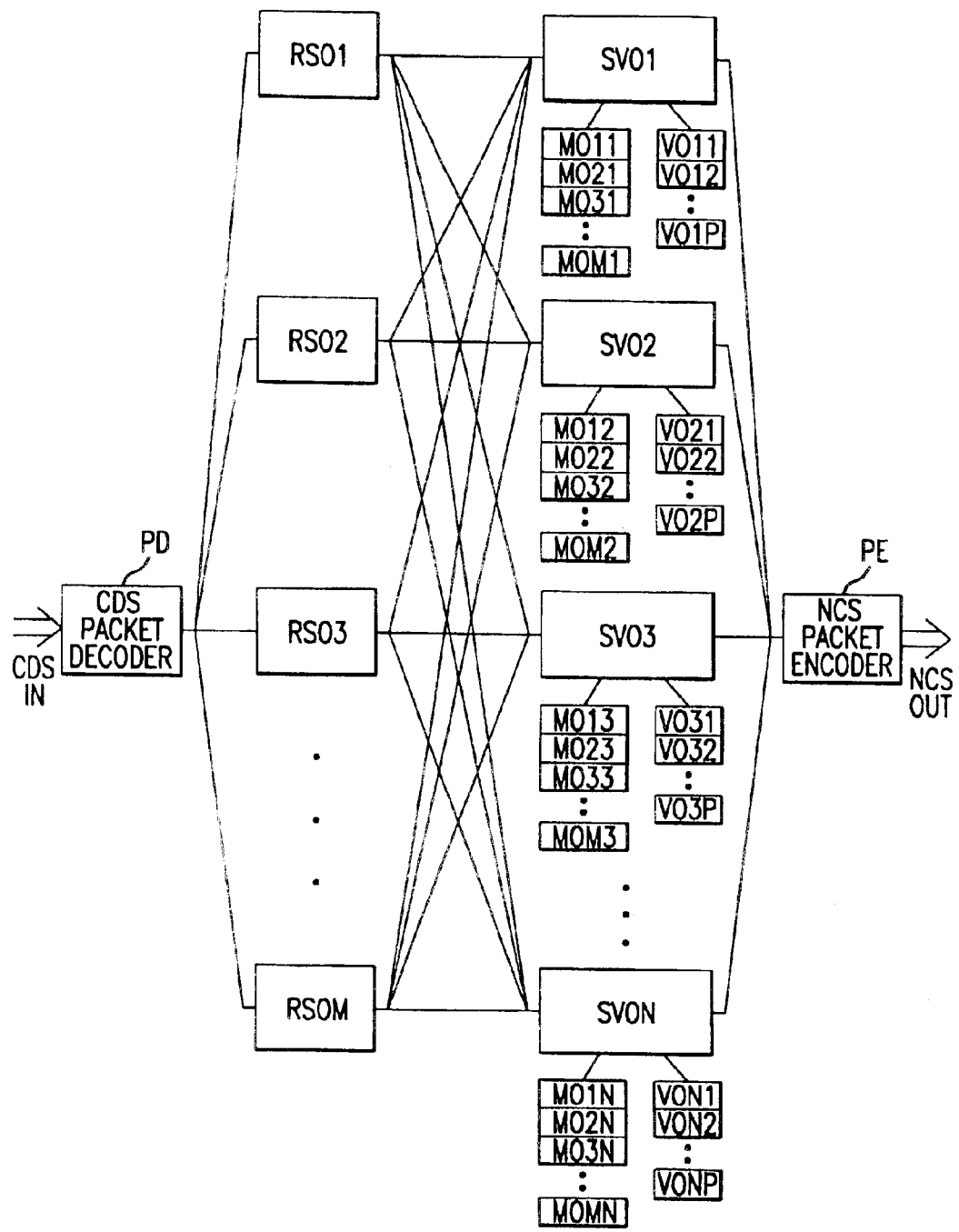
FIG. 7 illustrates schematically the flow of data at a network processor in accordance with embodiments of the invention.

FIG. 7 illustrates schematically the flow of data at the network processor NP as the composite data stream CDS message packets are received and processed to form the network correction stream NCS message packets. An object-oriented approach is used in which several principal object types are instantiated as needed:

a packet decoder object PD, a plurality of reference station objects RSO1, RSO2, RSO3, . . . RSOM, each corresponding to one of M reference stations whose measurements are to be processed, a plurality of satellite objects SVO1, SVO2, SVO3, . . . SON, each corresponding to one of N satellites being tracked by one or more reference stations, a plurality of measurement objects MO11, MO12, MO13, . . . MOMN, one measurement object being instantiated for each satellite being tracked by each reference station and associated with the corresponding satellite object (MO11 corresponds to the measurements from RS1 for SV1, MO12 to measurements from RS1 for SV2, MO2N to measurements from RS2 for SVN, MOM1 to measurements from RSM for SV1, MOMN to measurements from RSM for SVN, etc.), a plurality of vernier cell objects VO11 . . . VO1P, VO21 . . . VO2P, . . . VON1 . . . VONP, each corresponding to one of N satellites participating in as many as P vernier cells (VO11 corresponds to the participation of SV1 in vernier cell 1, VO1P corresponds to the participation of SV1 in vernier cell P, VONP corresponds to the participation of SVN in vernier cell P)

a packet encoder PE which prepares NCS packets and places them in the outgoing data stream.

Processing operations at the network processor are performed in multiple threads, so that many operations described here in sequential fashion for ease of understanding are in practice carried out in parallel.

It will be recalled that the composite data stream CDS includes several message types: (i) measurements such as pseudorange PR and phase $\phi$ for each of the L1 and L2 frequencies for each satellite in view at the reference station, (ii) ephemerides for each satellite in view at the reference station, and (iii) iono parameters and time parameters. As the CDS packets arrive at the network processor, a packet decoder object PA retrieves a packet from the buffer at 805, extracts the message from the packet at 810, performs a checksum at 815, and passes the message to an input buffer to await further processing by epoch according to its time tag.

As will be seen, messages are passed from the input buffer to the reference station object RSO1 . . . ROOM corresponding to the reference station identifier contained in the message. For example, a message containing data from RS1 is routed to RSO1, and a message containing data from RSM is routed to RSOM. The reference station object relays the message to the satellite object SVO1 . . . SVON corresponding to the satellite identifier contained in the message. For example, a message containing data relating to SV1 is routed to SVO1, and a message containing data from SVN is routed to SVON. Ephemeris, iono and clock data is stored at the satellite object, while measurement data is passed to measurement objects MO11 . . . MOMN for preliminary processing. For example, measurement data from RS1 for SV1 is routed to MO11, and measurement data from RSM for SVN is routed to MOMN.

After preliminary processing, each satellite object retrieves from its measurement objects the measurements from all reference stations pertaining to it, and calculates corrections for the corresponding satellite. For example, preprocessed measurements from all reference stations tracking SV1 are retrieved by SVO1 from measurement objects M011 . . . MOM1, and preprocessed measurements from all reference stations tracking SVN are retrieved by SON from measurement objects MO1N . . . MOMN. Each vernier cell object then applies the correction data to determine residual errors remaining at the reference station locations and to create a set of error-field parameters describing the residual errors from that satellite within a vernier cell region for each epoch. After processing, the corrections and error-field parameters are placed in packet messages which are inserted in the network correction stream. Ephemeris iono and clock data are also placed in packet messages which are inserted in the network correction stream.

Figure 8:
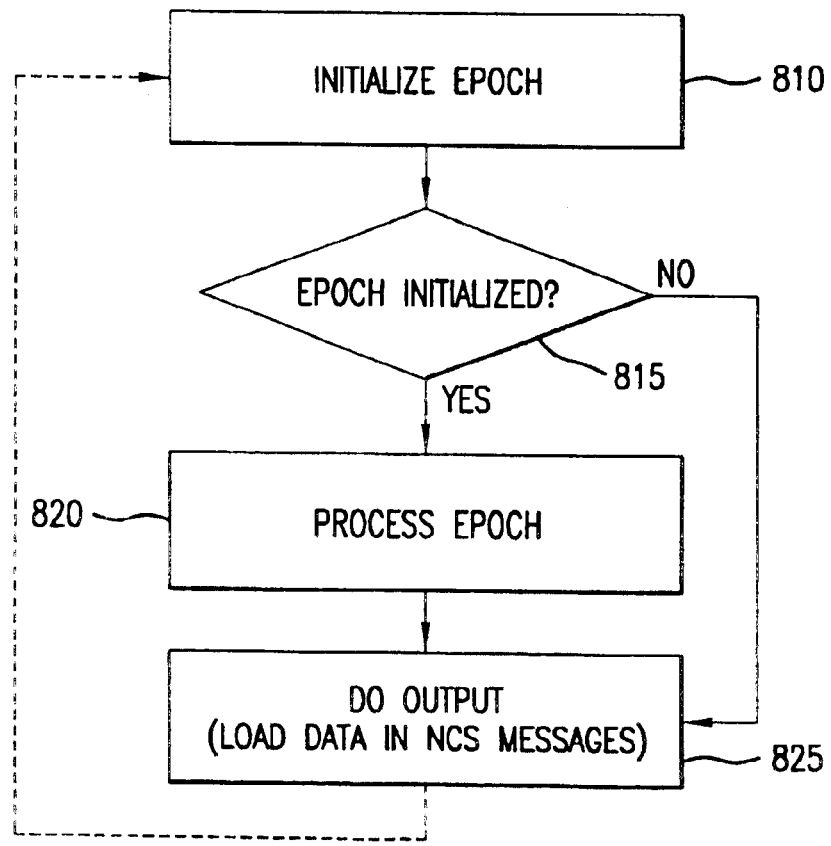
FIG. 8 is a flow chart illustrating operation of a network processor in accordance with embodiments of the invention.

FIG. 8 shows a high-level view of processing at the network processor. First, a new epoch is initialized at 810. A check is made at 815 to assure that the epoch is initialized, e.g., whether there enough input data from the reference stations to process correction data for that epoch. If the epoch is not initialized, control passes to a do output operation 825 which provides data such as satellite ephemerides in an NCS Type 5 message or other data indicating to users that the network processor is still alive. When an epoch is initialized, the epoch is processed at 820. The resulting data is packetized in do output operation 825 and inserted as messages of the appropriate type into the network correction stream NCS. The process repeats from epoch to epoch.

Figure 9A:
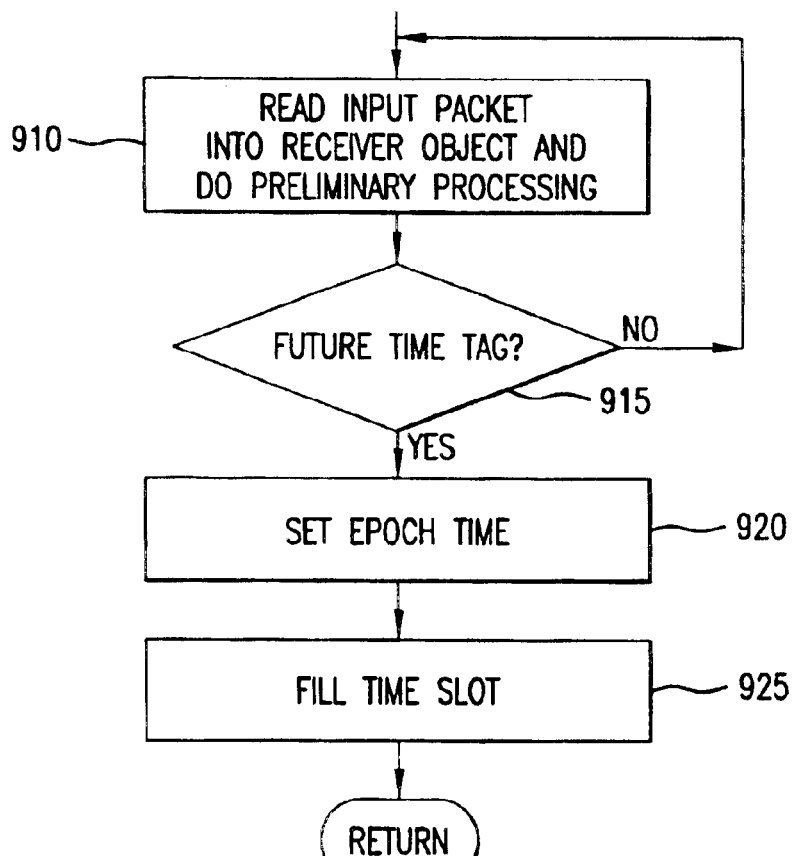
FIG. 9A shows in more detail the initialize epoch operation 810 of FIG. 8.

FIG. 9A shows in more detail the initialize epoch operation 810. An arriving CDS packet is read into the appropriate reference station object and preliminary processing is performed at 910. A check is made at 915 whether a packet with a future time tag with respect to the current epoch has been received. If no packet having a future time tag with respect to the current epoch has been received, then operation 910 repeats. When a packet having a future time tag with respect to the current epoch has been received, a new epoch time is set at 920. Then a fill timeslot operation is performed at 925. This completes the initialize epoch operation 810 and control returns to the main network processor flow.

Figure 9B:
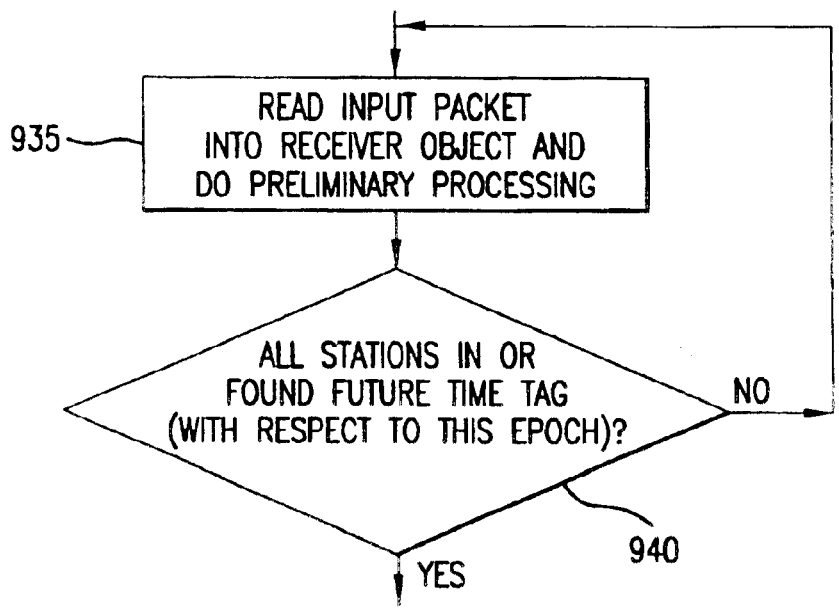
FIG. 9B shows in more detail the fill timeslot operation 925 of FIG. 9A.

FIG. 9B shows in more detail the fill timeslot operation 925. The next CDS input packet is read into the corresponding reference station object and preliminary processing is performed at 935. A check is made at 940 whether one of two conditions is met: either measurements have been received from all reference stations, or a packet has been received having a future time tag with respect to this epoch. If neither condition is met, operation 935 is repeated for the next packet. If either condition is met, then it is time to process the measurements for this epoch and the fill timeslot operation ends. That is, even if measurements have not been received from all reference stations, the process epoch operation cannot wait because a reference station has now provided a measurement for the next epoch.

Operations 910 and 935 are closely related. Packets received from the CDS are managed in two parts. The first part is at operation 910 where the packet time tags are examined to find a new time tag with respect to the previous epoch so a new epoch will be started at operation 920. Having started a new epoch, operation 935 continues to read input packets into the receiver objects until one of the conditions of check operation 940 is satisfied, e.g., either measurements have been received from all reference stations for this epoch or a measurements has been received from a reference station for the next epoch.

Figure 10:
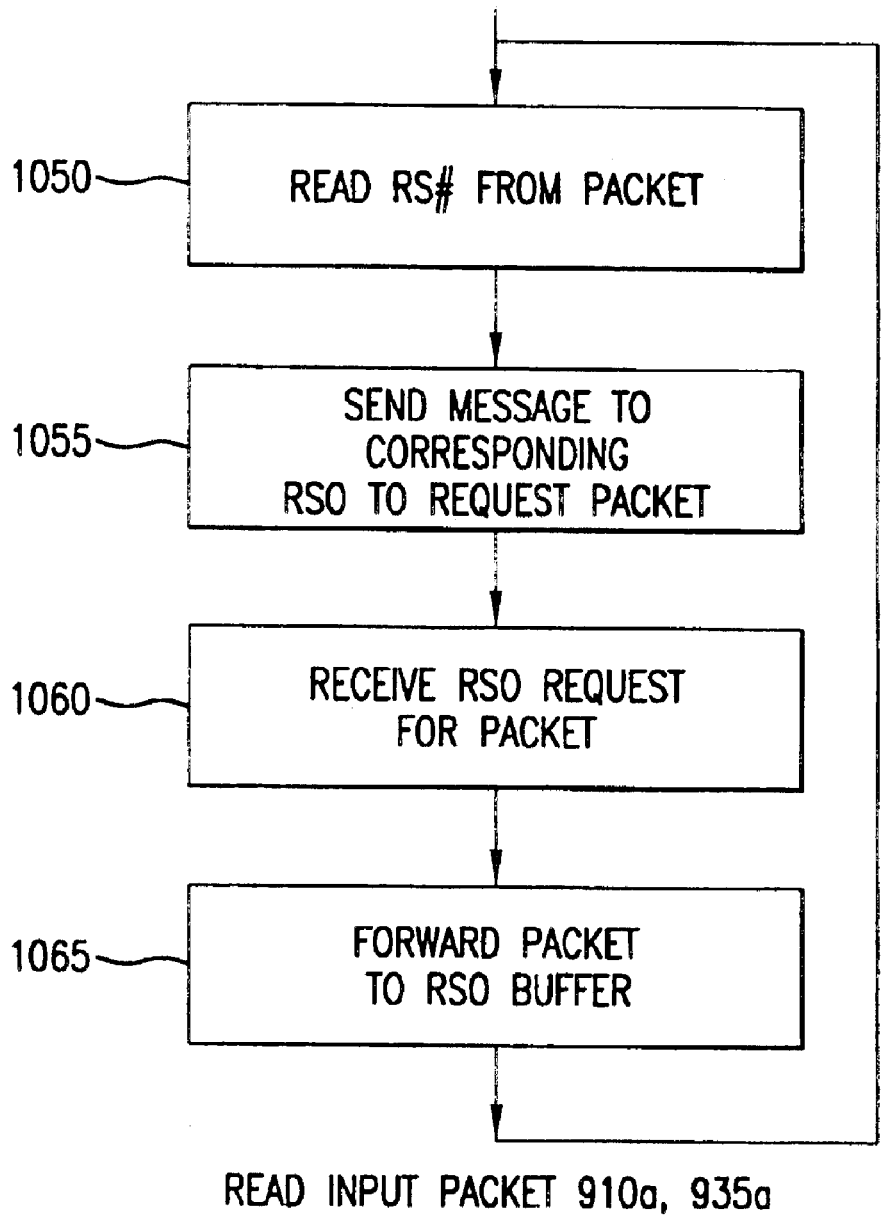
FIG. 10 shows in more detail a part of the read input packet operations 910 and 935 of FIGS. 9A and 9B.

FIG. 10 shows a part of the read input packet operation 910. As a CDS packet arrives in the network processor's input buffer, packet decoder DP reads the reference station identifier from the packet at 1050 and sends a message to the corresponding RSO at 1055 instructing the RSO to request the packet. When a request for the packet is received from the RSO at 1060, the packet decoder DP forwards the packet to an RSO buffer at 1065.

Figure 11:
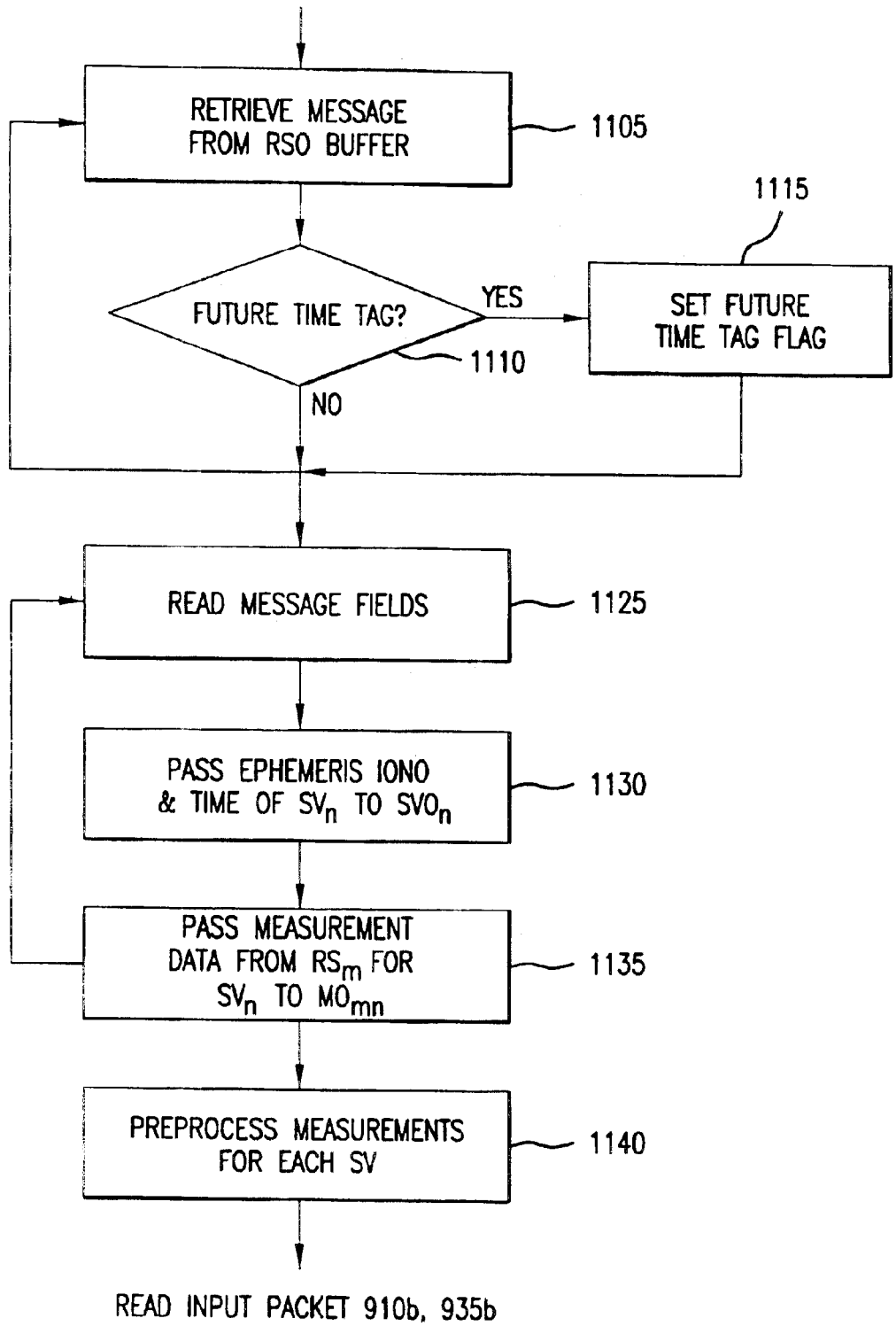
FIG. 11 shows in more detail a part of the read input packet operations 910 and 935 of FIGS. 9A and 9B.

FIG. 11 shows a further part of the read input packet operation 910. After a packet is passed to an RSO buffer, it is retrieved at 1105 and its time tag checked at 1110. If it is a "future" time tag with respect to the current epoch, then a future time tag flag is set at 1115. The future time tag flag is examined at operation 915 (described above) to determine whether a new epoch time is to be set. Operations 1005–1015 continue in a loop so that messages have their time tags checked as they arrive.

Then the message fields are read at 1125. Ephemeris, iono and time data for an SV is passed to the corresponding satellite object at 1130, e.g., satellite data for SVn is passed to SON. Measurement data is passed to the corresponding measurement object at 1135, e.g., measurement data from RSm for satellite SVn is passed to object Momn. Operations 1125–1135 continue in a loop so that messages are read and passed to the appropriate location for processing. The satellite objects and measurement objects perform measurement preprocessing at 1140.

Figure 12:
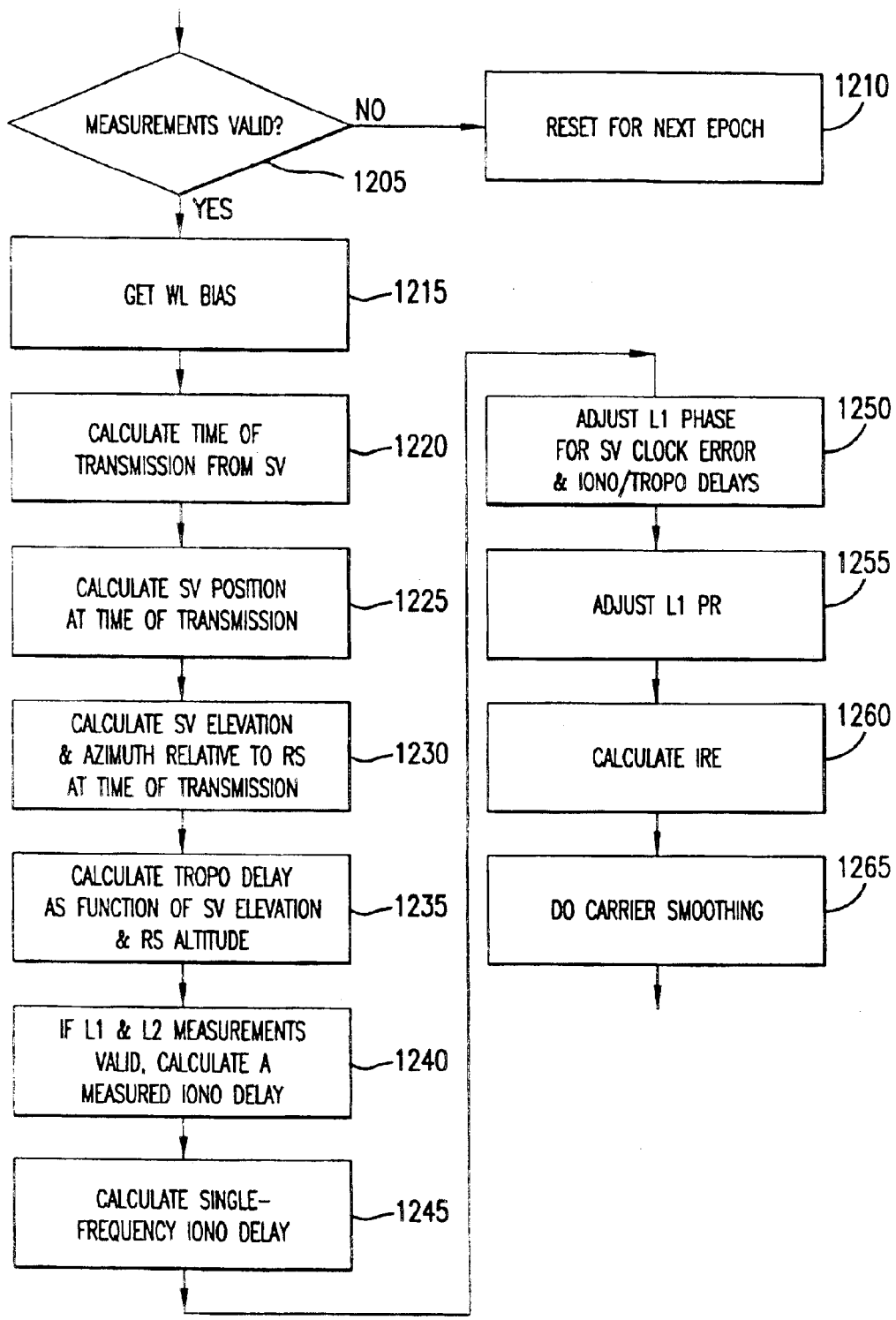
FIG. 12 shows in more detail the preprocess measurements operation 1140 of FIG. 11.

FIG. 12 shows in more detail the measurement preprocessing operation 1140 performed for each satellite. The measurements are checked for validity at 1205 in a variety of ways. For example, a check is made to assure that ephemeris data is available for the satellite to which the measurements relate, and that the ephemeris data is current relative to the time of the measurement. A check is made to see if the reference station making the message has reported an L1 carrier-frequency cycle slip. Other checks are made such as confirming availability of an L1 phase measurement and P-code on L1, determining signal-to-noise ratio, pseudo range, and code lane. A check is made on how long it has been since a prior message was received from this reference station, as it is desirable to compare measurements from a series of time intervals for consistency. The change in PR between this measurement and prior measurements are checked. A check is made to see if the reference station made a clock reset, because if it did the PR's will make a jump. The difference between PR and phase multiplied by wavelength is compared to assure it is consistent within a desired limit. Similar checks are made on the L2 measurements, and the phase and code measurements for L1 and L2 measurements are cross-checked for consistency.

If the measurements are not valid, they are thrown out, e.g., the buffers are reset at 1210 to await measurements for the next epoch. If the measurements are valid, preprocessing continues by getting the wide lane bias at 1215.

The time of transmission of the satellite signal is calculated at 1220, e.g., of the signal from which this set of measurements was taken. The satellite position at the time of transmission is calculated at 1225. The satellite's elevation and azimuth relative to the reference stations at time of transmission is calculated at 1230. The tropo delay is calculated at 1235 as a function of satellite elevation and reference station altitude. Various models are known for calculating tropo delay. A simple exponential model of the density of the atmosphere is used in preparing and using the tropo parameters (Delta Refractivity and Delta Scale Height) of the exemplary NCS Type 4 message format given in Table E above. Atmospheric density is related to the index of refraction and assumed to be exponential. If L1 and L2 measurements were found valid, they are used to calculate a measured iono delay at 1240. This has the added benefit of making iono corrections from dual-frequency measurement available, via the NCS Type 4 messages, to mobile equipment which have only single-frequency capability. If iono parameters are available for the single-frequency model, they are used to calculate an iono delay at 1245. The L1 phase measurement is adjusted at 1250 for satellite clock error and iono and tropo delays, and the L1 PR is similarly adjusted at 1255. An ire (instantaneous range error) is calculated at 1260 as adjusted PR minus the range that was calculated for that SV.

Carrier smoothing is performed at 1265 to obtain a PR value that is quieter than the PR measurement, e.g., with simultaneous carrier and phase measurements, the PR is used to find a bias (offset) in the carrier measurement and a PR is created using that bias and the carrier measurement. The PR is the distance between the satellite and the receiver (dus), modified by the receiver's clock error ($\phi eu$), the satellite's clock error ($\phi es$), tropo error (Terror) and the iono error (Ierror):

$$PR = dus + \phi eu - \phi es + Terror + Ierror + \ldots$$

The phase is essentially the same, except that the iono error has an opposite sign, and there is a bias (B):

$$Phase = dus + \phi eu - \phi es + Terror - Ierror + B + \ldots$$

The ire takes account of all the elements of the PR that are known to this point. Still unknown are errors in the reference station clock, the satellite's ephemeris and clock, and iono and tropo. Each satellite object having enough information to do so calculates an ire for the corresponding satellite during the preprocessing of operation 1040.

FIG. 13 shows in more detail the process epoch operation 920. A procedure is called to remove reference-station clock biases at 1305. An output is calculated for each satellite at 1310. Error field parameters for each vernier cell are calculated at 1315. Clock steering is performed at 1320. Output checks are done at 1325. This includes checking the magnitude of outputs against scaling limits and reducing the quality indicator of corrections for the satellite clock if the integral of acceleration across the output interval is excessive. Statistics are provided and data are logged at 1330 for network monitoring and analysis.

FIG. 14 shows in more detail the remove reference-station clock biases operation 1305. The synchronization subnet technique described here is used to synchronize the clocks of reference stations which are not tracking the same satellite. It is known that reference station receivers which are tracking the same satellite can be readily synchronized with one another. When reference stations receivers of the network are distributed such that not all can always track at least one satellite in common (a common-view satellite), then the reference stations are grouped logically into synchronization (common-view) subnets in which the receivers of each synchronization subnet are tracking at least one and preferably more than one satellite in common. The logical grouping is made such that adjacent synchronization subnets overlap, i.e., have at least one and preferably more than one reference station in common at all times.

Consider, for example, the network of FIG. 4 having subnets 405, 410 and 415. Subnet 405 includes reference stations 420, 425, 430, 435 and 440. Subnet 410 includes reference stations 440, 445, 450 and 455. Subnet 415 includes reference stations 450, 455, 460, 465 and 470. Each subnet is selected such that all of its reference stations have at least one satellite and preferably more than one satellite in common view during each epoch. These common-view satellites constitute the subnet's netset for the epoch. For each reference station, the netset measurements are used to estimate a clock bias, i.e, the measurements taken by that reference station using signals from the netset satellites are used to calculate an estimated offset of the reference station clock relative to the netset satellites. The clock offset estimates for all reference stations of a subnet are thus determined using only satellites of the netset for that subnet.

One of the subnets is selected as the master, e.g., subnet 415. The clock-offset estimates of the master subnet's reference stations are averaged and an adjusted offset estimate is determined for each reference station which will synchronize the reference station clocks of the master subnet with one another. The clock offset estimates of the other subnets are likewise averaged, e.g, the clock offset estimates of subnet 410 are averaged and the clock offset estimates of subnet 405 are averaged so that for each reference station an adjusted offset estimate is determined which will synchronize the reference station clocks within each subnet. As there is no guarantee of common-view satellites across all subnets, the reference stations of the overlapping regions are used to synchronize the subnets. Two different adjusted offset estimates are thus determined for each reference station within an overlapping region, e.g. for each of reference stations 450 and 455 a first adjusted offset estimate is determined to synchronize with subnet 415 and a second adjusted offset estimate is determined to synchronize with subnet 410. The average difference between the first and second adjusted estimates of the reference stations in the overlapping region, e.g. of reference stations 450 and 455, is then used to further adjust the adjusted clock offset estimates of the remaining reference stations of subnet 410. The clocks of reference stations of subnet 410 are set accordingly such that they are synchronized with one another and with those of subnet 415. The procedure is repeated using reference stations in the overlapping region with the next subnet, e.g., reference stations 435 and 440 are used to synchronize subnet 405 with subnet 410. With this technique, all reference stations of the network can be synchronized even though there is no satellite in common view of all reference stations of the network.

Referring again to FIG. 14, a list is prepared at 1405 of which reference stations are providing measurements for which satellites in this epoch. The list is examined to find at 1410 the netset for each subnet for this epoch, e.g., for each subnet, the netset is the set of satellites tracked during this epoch by all reference stations of the subnet. For each subnet, the individual clock offset for each reference station is estimated at 1415 using the measurements for the netset satellites. For each subnet, the offsets are averaged over the subnet at 1420. The clock bias of each reference station of the master subnet is set at 1425 based on the average for the master subnet, e.g., an adjustment for each reference station clocks of the master subnet is determined such that all reference station clocks of the master subnet are set to the average. The clock biases of the reference stations of the slave subnets are then adjusted at 1430 to conform with the master subnet.

Figure 15:
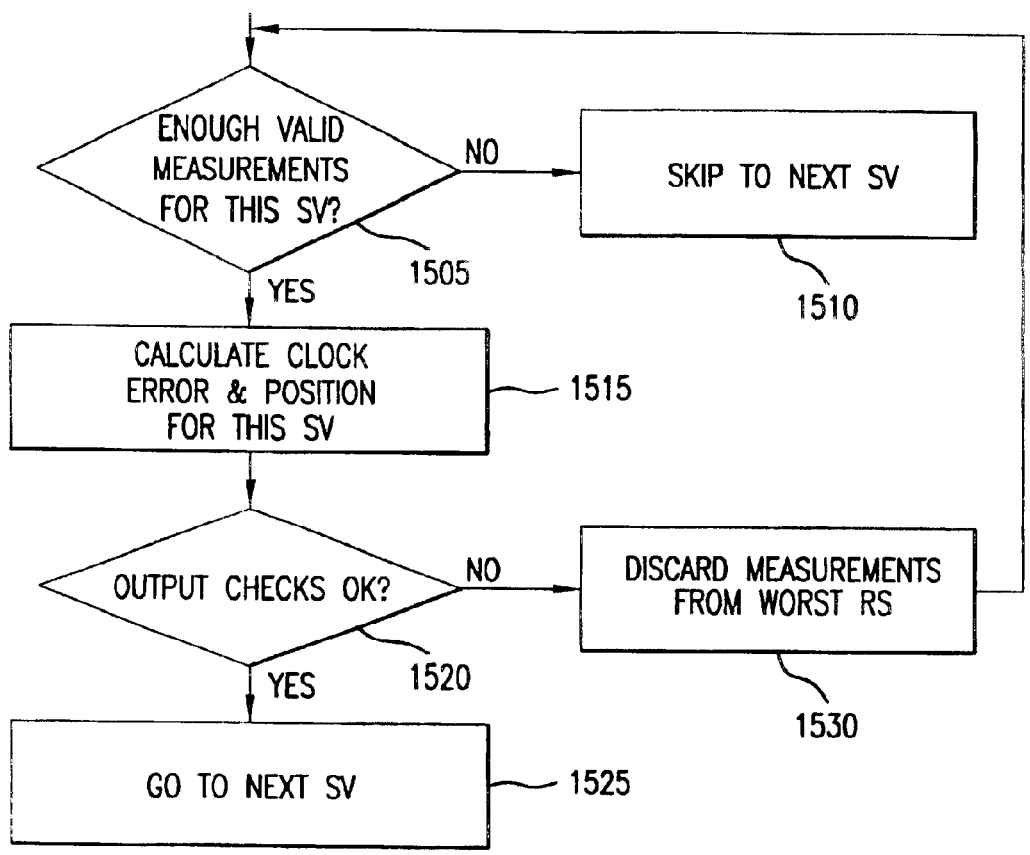
FIG. 15 shows in more detail the calculate output operation 1310 of FIG. 13.

FIG. 15 shows in more detail the calculate output operation 1310 which is performed each epoch for each satellite. A check is made at 1505 whether enough measurements are available, e.g., measurements from three reference stations. The minimum data set for processing is determined by what is to be calculated. Measurements from four reference stations would normally be required to calculate satellite position and satellite clock error (e.g., x, y, z, and t), though selecting a satellite-centered coordinate system allows this to be reduced to three measurements (x, y, and a combination of z and t). It is hard to distinguish between the clock component t and the z component by examining the radial component of the satellite's position error as all reference stations that can see the satellite are affected about the same by the radial component of the error. Thus, choosing a coordinate system with components for radial, down-plane and cross-plane of the satellite's orbit can reduce the number of measurements required.

If not enough measurements are available, the process skips to the next satellite at 1510. If enough measurements are available, the satellite's position and clock error are calculated at 1515. These results are checked at 1520 to assure they are within acceptable limits, e.g., checking for consistency with prior measurements for this satellite, and checking gdop for the group of reference stations whose measurements are used to calculate the satellite's position and clock error. If not acceptable, the measurement set from the worst reference station is discarded at 1530 and the process is repeated from operation 1505.

FIG. 16A shows in more detail operation 1315 in which error field parameters are calculated for each satellite visible within a vernier cell during the epoch (e.g., in FIG. 5, the vernier cell for the state of California or for the San Francisco Bay area, Los Angeles area or San Diego area). One way to implement this is to link each of the satellite objects SON to a vernier processor object which performs the calculation for that satellite.

It will be recalled that the vernier cells are regions of the network where reference-station spacing is reduced. This local densification of reference stations allows for supplemental correction within the vernier cell regions to compensate for residual errors, e.g., errors remaining within the vernier cell regions after corrections derived from the network as a whole have been applied. The supplemental corrections for the vernier cell are preferably described in a compact message so as to minimize distribution bandwidth. For example, the NCS Type 3 message shown in Table D identifies the vernier cell (VernierID), its origin (x0, y0, z0) and its effective radius (range) and, for each satellite visible in the vernier cell, identifies the satellite (svID), the quality of its signal, a time tag (iode) and a set of error-field parameters (a0, a1, a2). The vernier cell identifier and origin normally remain fixed from epoch to epoch. For each epoch, the error-field parameters are calculated satellite-by-satellite for each satellite visible in the vernier cell's region.

A simple model for the vernier cell error field is preferred, though more complex models can be employed if desired. A model which has proven effective is:

$$v = a0 + a1 \cdot R \cdot (vrs.lon - vo.lon) \cdot \cos(vo.lat) + a2 \cdot R \cdot (vrs.lat - vo.lat)$$

in which v=error for this satellite at a location (vrs.lon, vrs.lat) within the vernier cell's range a0=error-field centroid value for this satellite a1=error-field longitude coefficient for this satellite R=radius of the earth vrs.lon=longitude of the location vo.lon=longitude of the vernier cell's origin cos(vc.lat)=correction for earth's curvature a2=error-field latitude coefficient for this satellite vrs.lat=latitude of the location vo.lat=latitude of the vernier cell's origin Thus in this model the error due to the satellite error at a declared location (vrs.long, vrs.lat) is defined by the centroid value a0, a coefficient a1 for the east-west distance of the declared location from the vernier cell's origin, and a coefficient a2 for the north-south distance of the declared location from the vernier cell's origin.

Figure 16B:
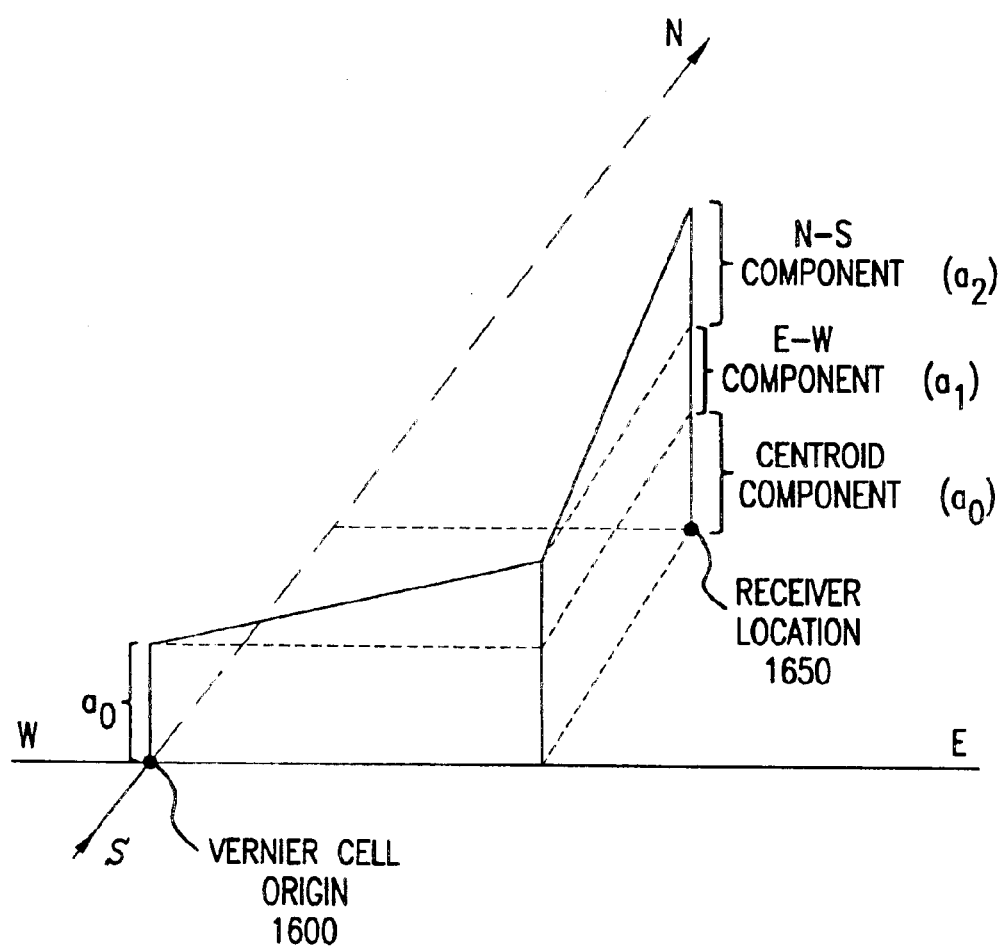
FIG. 16B shows graphically the elements of a vernier cell error field in accordance with embodiments of the invention.

FIG. 16B shows graphically two points of the vernier cell error field: the vernier cell origin 1600 and a point 1650 within the vernier cell, e.g., at which a receiver is located. The error field about a vernier cell origin is defined by a centroid component a0, an east-west slope a1, and a north-south slope a2. The correction at a location 1650 within the vernier cell the sum of the a0 component, an east-west component and a north-south component. The a0 component is specified at the lat/lon of the vernier cell's centroid. The east-west component is a product of the a1 slope (expressed for example in meters of correction per kilometer) and the east-west distance from the vernier cell origin, with correction for the earth's curvature. The north-south component is a product of the a2 value (also expressed as a slope) and the north-south distance from the vernier cell origin.

Referring again to FIG. 16A, parameters for the vernier cell are retrieved at 1605, e.g., the list of reference stations in the vernier cell, the clock error for the satellite for which the error field parameters are to be calculated, and the measurements for that satellite from each reference station of the vernier cell. A matrix h is constructed at 1610 to receive data for each reference station of the vernier cell which is tracking this satellite. A check is made at 1615 whether the matrix has enough data to compute the error-field parameters, e.g., measurements for this satellite at three reference stations in the vernier cell are needed to compute the three error-field parameters.

If not enough data is available to compute the error-field parameters for this satellite, an optional feature is to calculate only one error-field parameter at 1620, e.g., centroid value a0. This is based on the assumption that if, for example, only one reference station of a vernier cell can see this satellite, and this satellite can be seen by a mobile GPS receiver located within the vernier cell, then the mobile GPS receiver is likely to be near the reference station which can see this satellite. Thus it is considered safe to use that one reference station as a sole source for the vernier correction for this satellite. If two reference stations can see this satellite, then an average or other combination of their values may be used.

If the matrix has enough data to compute the error-field parameters for this satellite, then the vernier cell error field terms a0, a1 and a2 are computed at 1625 using the available data. To do this, the satellite's position at a specified time (e.g., time of transmission of a satellite signal used to measure its position) is calculated using all available data, including the corrections obtained from the network measurements. This calculated satellite position is used to define a line-of-site vector to the location of each reference station of the vernier cell. The dot product of the line-of-site vector with the satellite position-error vector is the component of the satellite position-error vector which would affect the pseudorange determined for this satellite at the reference station's location. The satellite clock error is also known from the network corrections. From this information an adjustment to instantaneous range error can be determined for the reference station.

The adjusted instantaneous range error thus represents the residual error at the reference station after making use of the available corrections for network and satellite errors and iono and tropo propagation delays. The instantaneous range errors for the reference stations of the vernier cell are then synchronized by removing individual reference station clock errors, producing a clock-adjusted instantaneous range error value irersc for each reference station.

Error-field parameters a0, a1, a2 for the vernier cell can be determined from the set of clock-adjusted instantaneous range error values using, e.g., a least-squares or a Kalman filter technique. A measurement-sensitivity matrix h is filled with the irersc values for the vernier cell's reference stations and used in a vector matrix equation such as $$\underline{c} = h \cdot \underline{a}$$

to solve for the error-field parameters a0, a1 and a2 of vector $\underline{a}$, where vector $\underline{c}$ is the residual measurement error after applying network corrections. Because matrix h is not necessarily square, e.g., may represent five equations (iresc values for five reference stations of the vernier cell) with three unknowns (a0, a1, a2) and is thus over-determined, both sides of the equation are multiplied by the transpose, hT, of h, and the square matrix hTh is inverted to produce the least-squares solution. If a gdop limit has been set, it can be used at this stage exclude from the calculation those data which are outside the gdop limit. Then $$\underline{a} = (hTh)^{-1} hT \, \underline{c}$$

The vernier cell corrections are thus defined by the error-field parameters for each of the satellites in view at the reference stations of the vernier cell.

Referring again to FIG. 16A, the vernier cell corrections are checked at 1630 by calculating a position fix for each reference station of the vernier cell using the network corrections and the error-field parameters, and comparing the calculated position fix with the known position of the reference station to determine a residual error after application of the vernier cell corrections. The comparison indicates how well the error field parameters for this satellite describe the residual error over the vernier cell region before application of the vernier cell corrections.

The vernier cell corrections are further checked for validity at 1635. The validity checks can take the form of: summing the residual errors at all reference stations of the vernier cell after application of the vernier cell corrections, summing the squares of these residual errors, calculating the average value of these residual errors, calculating the standard deviation of these residual values, and/or other analysis. Also, the residual error at each reference station of the vernier cell after application of the vernier cell corrections is compared with that of the other reference stations of the vernier cell to find the magnitude and location of the biggest such residual error. If the magnitude is within a predetermined maximum limit and the standard deviation is within limits, then the vernier cell error field corrections are considered valid. If the corrections are found valid at 1635, the error-field coefficients for this satellite are output at 1640. Otherwise, the vernier cell data for this satellite is reported as invalid at 1645. The report can include for example the standard deviation and maximum residual error.

The process just described for preparing and validating corrections employs a "divide and conquer" strategy to isolate error sources incrementally so that matrix sizes are kept small and computing resource requirements are correspondingly limited. This contrasts with prior techniques in which a larger number of measurements and error sources are dealt with simultaneously in a large Kalman filter, requiring greater computing resources.

Figure 17:
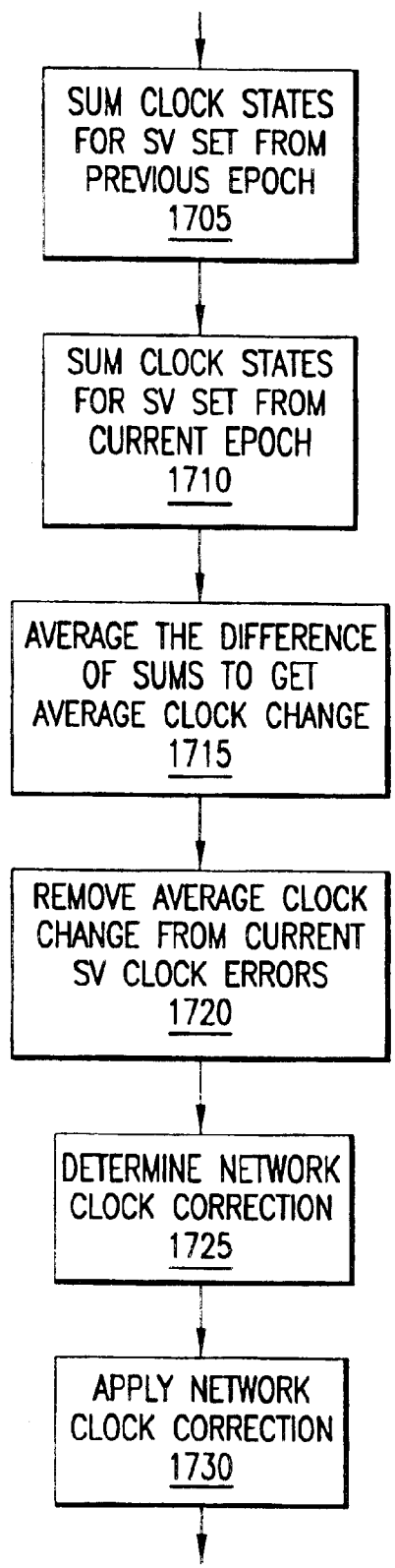
FIG. 17 shows in more detail the do clock steering operation 1320 of FIG. 13.

FIG. 17 shows in more detail the do clock steering operation 1320 of FIG. 13. Its purpose is to steer the network clock offset toward zero. The network clock offset is the average of the clock corrections applied to all the satellite clocks. If the clock error states for each satellite are averaged over a long time and these are averaged over many satellites, the average should be zero with respect to GPS time. If the average of the satellite clock error states determined by the network is non-zero, then the network's time differs by that amount from GPS time. The objective of clock steering is to steer toward zero the average of the satellite-clock corrections as determined by the network, and to avoid abrupt changes so that clock corrections do not occur in a step-wise fashion. For this purpose, the clock corrections to be compared from one epoch to the next should be for the same set of satellites.

In the example of FIG. 17, clock states for a set of satellites are summed at 1705 for the previous epoch and at 1710 for the current epoch. The average difference of these sums is determined at 1715 to obtain an average clock change. This average clock change is removed at 1720 from all satellite clock error estimates so that, at this point, there is zero change in the average clock correction across the set of satellites common to the current epoch and the previous epoch. A network clock correction is determined by applying a steering gain to the average clock correction at 1725. The steering gain controls how fast the network clock error is removed, and is set to assure that only a portion of the average clock error will be removed at each epoch. The network clock correction is then applied at 1730 to the satellite clock states of the network processor's satellite objects. This procedure avoids discontinuity in the average clock correction and steers the average clock correction to zero.

The do output checks operation 1325 of FIG. 13 assures the correction data are within tolerances before they are inserted in the network correction stream NCS. The checks can take many forms. It is possible, particularly when the satellite clocks are dithered as with Selective Availability in effect, that the output rate of NCS correction messages is too low to keep up with the rate of change of the satellite corrections. The NCS corrections in this case do not allow the user to compensate for the rate of change. The output rate of NCS messages is a design consideration which takes into account the available distribution bandwidth. If the rate of change of corrections exceeds one or more thresholds, the quality of the correction is downgraded correspondingly. Even though a good quality correction is determined at the network processor, the user is alerted by a downgraded quality indicator that the result obtained from the correction will not be so good because the corrections are not being distributed to the user at a high enough rate.

To summarize, the network processor calculates estimates for:

Error in satellite clocks

Error vectors for satellite positions

Iono model

Tropo model

Vernier cell error field parameters and supplies these in the network correction stream NCS. The mobile equipment receives the NCS and uses these estimates to generate a formatted correction signal appropriate to a declared location (e.g., a VRS correction stream for the location of the mobile equipment in RTCM or other format), a set of virtual measurements of pseudorange and phase, for L1 and L1, and/or to generate a corrected position fix at the location of the mobile equipment.

The mobile equipment can be arranged as: (1) a GPS receiver having an integrated VRS capability, such as the Trimble Ag132 receiver, or (2) a DGPS receiver with a separate VRS to process the NCS and feed a differential correction stream in a desired format such as RTCM or CMR to the DGPS receiver.

Figure 18:
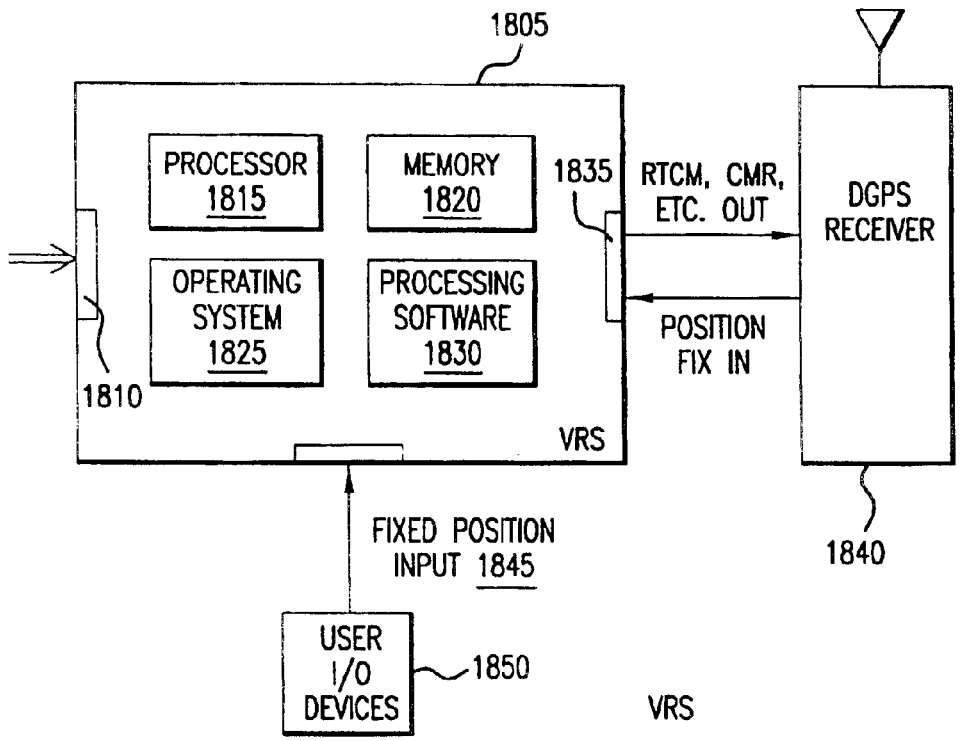
FIG. 18 shows schematically the principal elements of a virtual reference station in accordance with embodiments of the invention.

A VRS can be implemented as shown in FIG. 18 as a general-purpose computer 1805 having a data-input port 1810 for receiving the NCS, a processor 1815 with memory 1820, an operating system 1825 and software instructions 1830 for processing the NCS to produce correction data in the desired format, and an input/output port 1835 for passing the formatted correction data to a DGPS receiver 1840 and receiving position fixes from DGPS receiver 1840 to define a position for the VRS. Alternatively, the VRS position can be fixed by a user input as indicated at 1845, e.g., from a keyboard and/or other user input/output devices 1850. The VRS synthesizes the correction data which would be produced by a reference station sited at any declared location. The declared location can be fixed (such as at the threshold of an airport runway to provide correction data for the location of the runway threshold to be broadcast to landing aircraft) or can be mobile (such as on-board an aircraft or vehicle and supplied with the specified location from time to time from an on-board GPS receiver so that the corrections will be determined for the current location of the aircraft or vehicle).

At the VRS, satellite clock and ephemeris parameters from the NCS message are used with the declared position of the VRS to calculate the position of each satellite at the transmission time appropriate for the signal to arrive at the VRS at the current epoch time. Information from this calculation is used with ionospheric and tropospheric parameters from the NCS message to calculate an L1 pseudorange. Network corrections for satellite clock and position errors are obtained from the NCS message, and applied to the calculated L1 pseudorange. Vernier parameters obtained from the NCS message are used to calculate the difference between the calculated L1 pseudorange and a virtual measurement of L1 pseudorange at the declared location of the VRS. This difference is then applied to the calculated L1 pseudorange to obtain the virtual L1 pseudorange measurement. Virtual measurements of L2 pseudorange, and L1 and L2 phase are calculated from virtual L1 pseudorange by appropriate adjustments of the ionospheric delay. The vernier parameters in the NCS message were calculated in the network processor as a least-squares (or Kalman Filtered) fit to the difference between GPS measurements and corresponding calculated versions. Since the pseudoranges calculated in the network processor and those calculated in the VRS use the same models and parameters, the vernier field of differences between the calculated and measured values can be evaluated at the location of the VRS to obtain the difference between a virtual measurement at the VRS and the calculated value there. With a complete set of virtual measurements, the VRS can output DGPS corrections, e.g., RTCM, and output virtual measurements for RTK, e.g., CMR. From that, depending on the accuracy of what is supplied, it is possible to do code phase navigation or RTK navigation.

Figure 19:
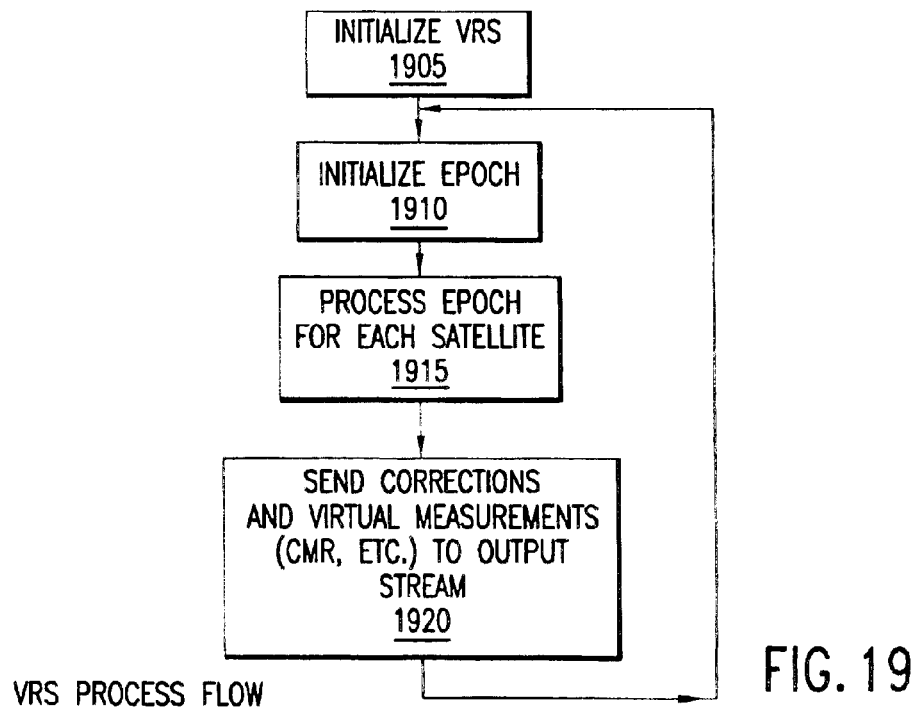
FIG. 19 shows operational flow of the virtual reference station of FIG. 18.

The basic operational flow of the VRS is shown in FIG. 19. The VRS is initialized at 1905, then a processing epoch is initialized at 1910. The epoch is processed for each satellite at 1915. Because the VRS is not receiving GPS satellite signals, it does not have the usual measurements that a GPS receiver would have. Instead, it uses the NCS data to synthesize GPS satellite measurements which would be obtained by a reference station if it were at the VRS location. The processed corrections are sent to the output stream at 1920, and the process returns to initialize a new processing epoch at 1910. The output stream can be, e.g., in RTCM, CMR or other desired format.

Figure 20:
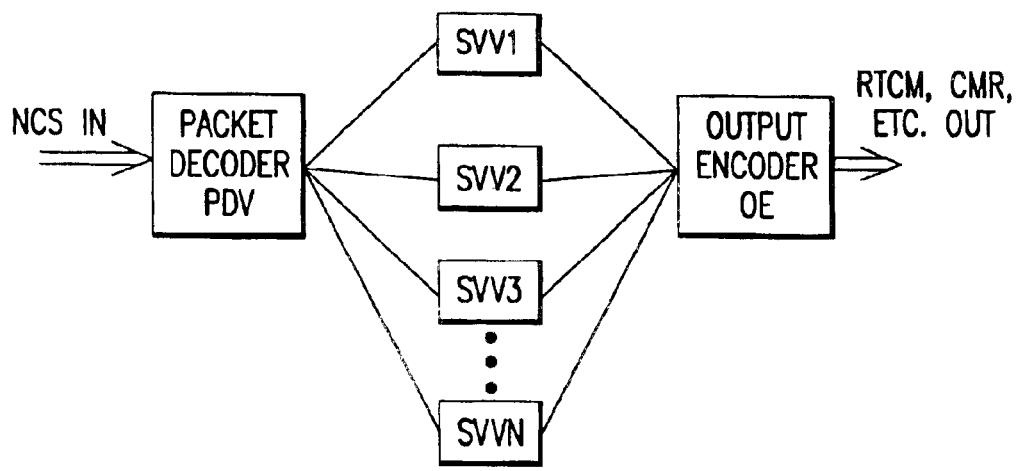
FIG. 20 illustrates schematically the flow of data at a virtual reference station in accordance with embodiments of the invention.

FIG. 20 illustrates schematically the flow of data at the VRS as the network correction stream NCS message packets are received and processed to form the output stream. An object-oriented approach is used in which satellite objects are instantiated as needed. The NCS packets are received at a VRS packet decoder object PDV, and the correction data for each satellite is passed to the corresponding satellite object SVV1 . . . SVVN. The satellite objects process the correction data to produce corrections in the desired output format. An output encoder OE places the corrections in the output stream.

Initializing the VRS at 1905 includes setting a station identifier, beginning to read the NCS packets into a VRS input buffer, and declaring a VRS location. The declared VRS location is the location for which the VRS is to prepare corrections; it can remain constant or can be updated from time to time, e.g., from an external source such as a mobile DGPS receiver which will use the corrections.

Figure 21:
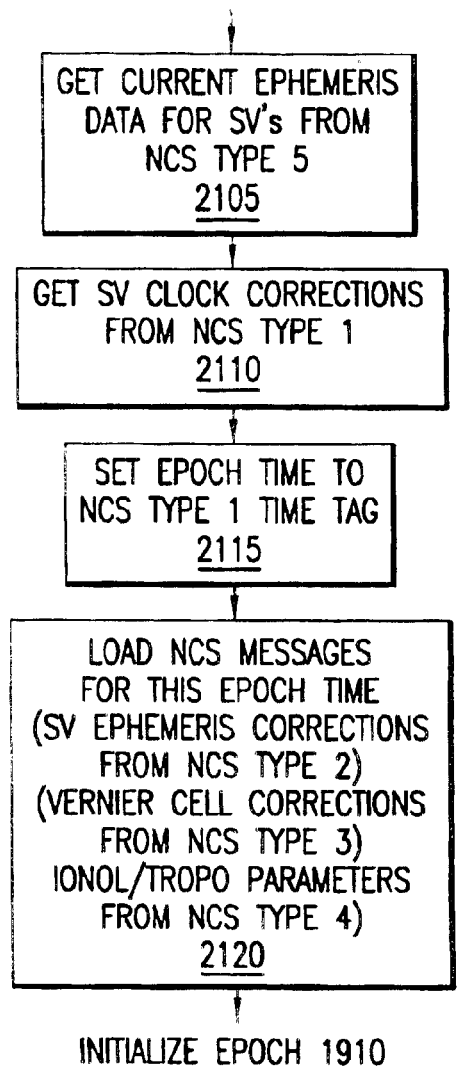
FIG. 21 shows in more detail the initialize epoch operation 1910 of FIG. 19.

FIG. 21 shows in more detail the initialize epoch operation 1910. Current ephemeris data for the GPS satellites are obtained at 2105 from an NCS Type 5 message and passed to corresponding satellite processing objects, one of which is instantiated for each satellite. The VRS obtains the ephemerides from the NCS Type 5 messages because it does not have a GPS receiver to receive these directly from the GPS satellites. The NCS input packets are monitored to obtain satellite clock corrections from an NCS Type 1 message at 2110. When an NCS Type 1 message is received, the epoch time is set according to its time tag at 2115. NCS messages bearing time tags for this epoch are loaded at 2120 into the VRS satellite objects for processing. The NCS type 1 message data for each satellite is passed to the corresponding satellite object which will process the data for that satellite.

Data from the other NCS messages are likewise passed to the corresponding satellite objects: Type 2 (satellite position errors), Type 3 (vernier cell parameters), Type 4 (iono and tropo parameters).

The VRS also obtains the geographical boundaries (e.g., origin and radius) of each vernier cell from the NCS type 3 messages, and checks at 2110 whether the VRS position is within one or more vernier cells. If within more than one vernier cell, it selects the appropriate one at 2115, e.g., the vernier cell having the smaller radius.

Figure 22:
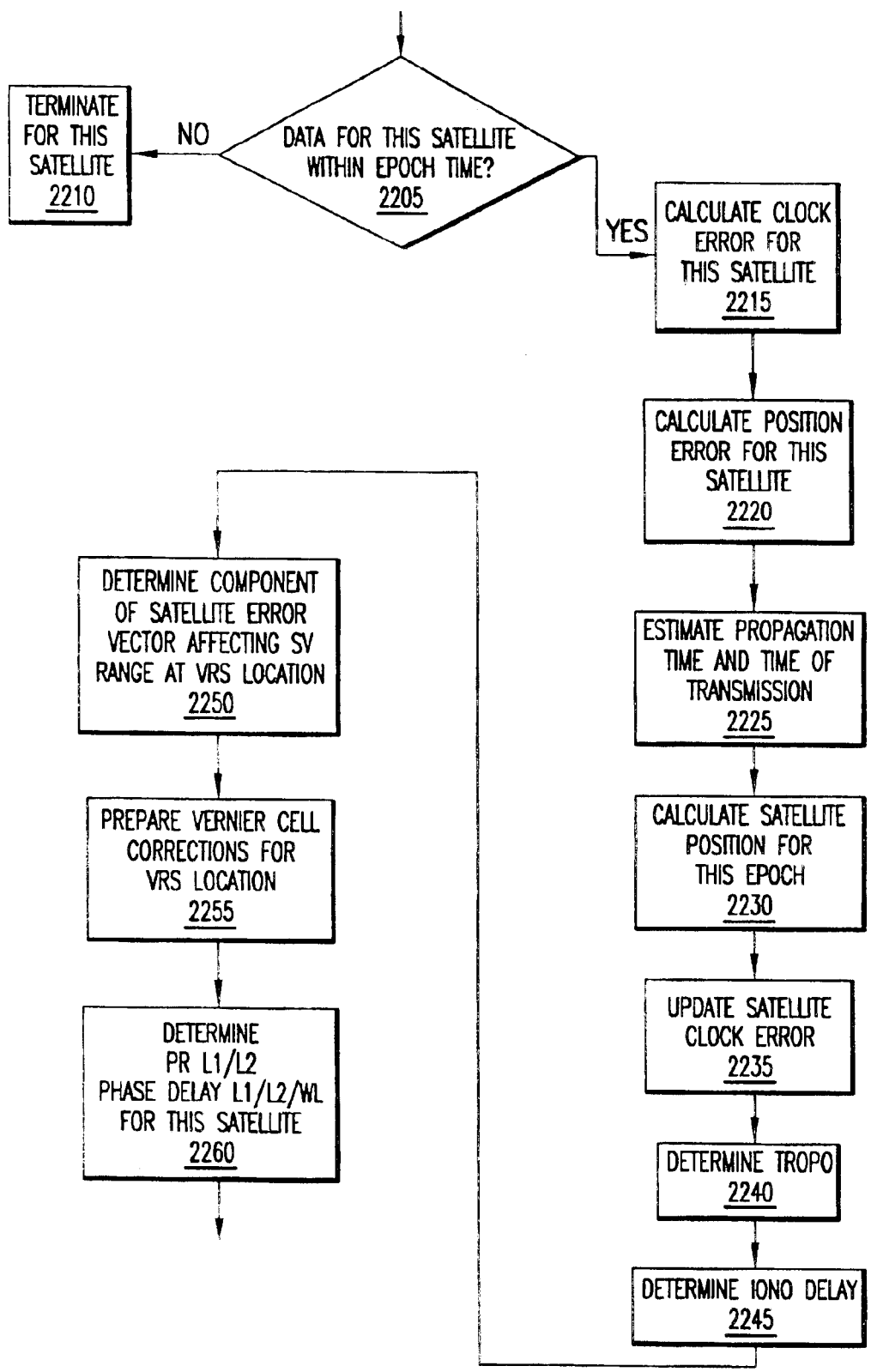
FIG. 22 shows in more detail the process epoch operation 1915 of FIG. 19.

FIG. 22 shows the process epoch operation 1915 which is performed for each satellite when a complete set of data is loaded for the epoch. The time tags of the data set for this satellite are checked at 2205 to confirm they are all for this epoch. If not, the process epoch operation is terminated for this satellite at 2210. Otherwise, the clock error for the epoch time is calculated at 2215 from the clock error provided in the NCS Type 1 message and from the clock-error rate of change. The clock-error rate of change can be determined at the VRS from a series of NCS Type 1 messages or can be determined at the network processor and transmitted in the NCS.

Components of the position error vector for this satellite are calculated at 2220. Starting with an estimated propagation time from the satellite to the VRS location, an estimated transmission time is calculated at 2225 as the difference between the epoch time and the estimated propagation time. Using the satellite's ephemerides, the estimated transmission time and the estimated propagation time, a calculation is performed at 2230 to determine the satellite's position at the time it was polled with that propagation time. The resulting satellite-position error is used to update the propagation time, and the satellite-position calculation is repeated.

The process iterates until the satellite-position difference between iterations is within a defined limit. A relativistic correction for the satellite's eccentric orbit is calculated for later use, as well as line-of-sight vectors and range from the satellite to the declared VRS location. The relativistic correction is added to the satellite clock error obtained from the NCS Type 1 message to produce an updated clock error at 2235.

Using the line-of-sight vectors and range and elevation, a tropospheric propagation delay from the calculated satellite position to the declared VRS location is determined for this epoch at 2240. If ionospheric parameters have been received for this satellite from an NCS Type 4 message, they are used to calculate ionospheric propagation delays from the calculated satellite position to the declared VRS location for the GPS L1 frequency, for the GPS L2 frequency, and for the "Wide Lane" frequency. The Wide Lane frequency is the difference between L1 and L2, integer wavelengths of which can be estimated from satellite to receiver similar to carrier phase integer estimation. A discussion of Wide Lane is found, for example, in R. HATCH, *The Promise of a Third Frequency*, GPS WORLD, May 1996, pages 55–58.

The position error vector for this satellite is now determined from the network data supplied in the NCS. The dot product of this vector with the line-of-sight unit vector from the corrected satellite position to the declared VRS location gives the error-vector component affecting the range at the declared VRS location at 2250. Vernier cell corrections are prepared at 2255 for the declared VRS location. Taking the calculated range from the satellite to the declared VRS position, the errors determined from the network (e.g., satellite clock error, satellite position error, tropo delay, iono delay) and the residual error at the declared VRS location if within a vernier cell (vernier cell corrections) are applied at 2260 to produce pseudoranges for L1 and L2 and phase delays for L1, L2 and Wide Lane.

Figure 23:
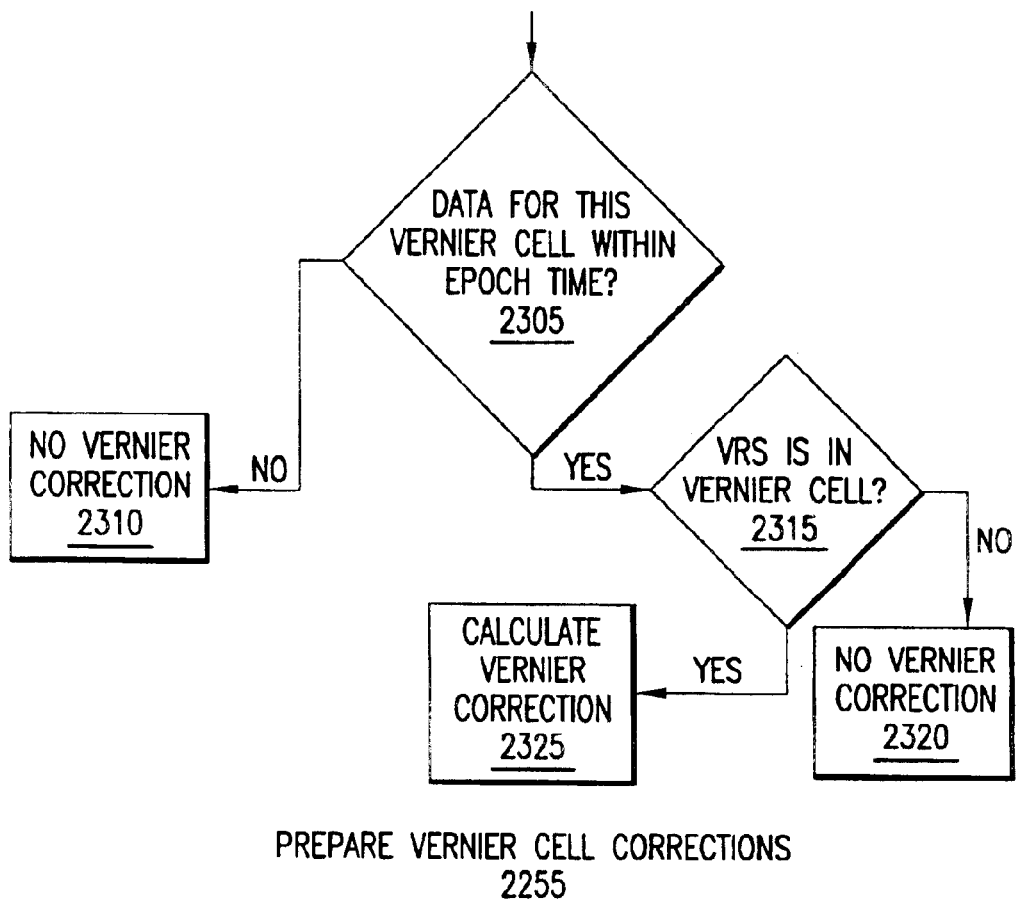
FIG. 23 shows more detail of operation 2255 in which the vernier cell corrections are prepared.

FIG. 23 shows more detail of operation 2255 in which the vernier cell corrections are prepared. Error-field parameters for each vernier cell are provided in NCS Type 3 message. The time tag of the message is checked at 2305 to assure that the error-field parameters are current with respect to the epoch time. If current data are not available at the VRS, no vernier correction is made. Otherwise, a check is made to assure that the declared VRS location is within the region for which the vernier cell error field is valid. That region is declared in the NCS type 3 message (e.g., origin and radius). If the declared VRS location is not within the vernier cell region, no vernier correction is made.

If the declared VRS location is within the vernier cell region, the vernier correction v for each satellite is calculated at 2325, e.g., using the model described above:

$$v = a0 + a1 \cdot R \cdot (vrs.lon - vo.lon) \cdot \cos(vo.lat) + a2 \cdot R \cdot (vrs.lat - vo.lat)$$

in which a0, a1, a2=error-field coefficients from the NCS Type 3 message
R=radius of the earth
vrs.lon=longitude of the declared VRS location
vo.lon=longitude of the vernier cell's origin
cos(vc.lat)=correction for earth's curvature
vrs.lat=latitude of the declared VRS location
vo.lat=latitude of the vernier cell's origin Further values can be calculated in process epoch operation 1915, such as the pseudorange correction value (prc) for use in an RTCM correction stream, and other types specified for CMR, RTK or other public or private formats.

Ionospheric propagation delay data based on single-frequency models may in some circumstances not be sufficient for carrier-phase RTK navigation. That is, the corrections when supplied to a DGPS receiver are insufficient to determine the integer number of carrier wavelengths from satellite to receiver. This can result when the iono data is determined using double-differencing techniques where the measurements are from reference stations that are too widely spaced. Dual-frequency models, e.g., employing GPS L1 and L2 frequencies to estimate iono delays, can overcome this limitation. Dual-frequency models for determining iono delays can be used when L2 codes become publicly available.

A GPS receiver having an integrated VRS capability obtains the ephemeris data of the NCS type 5 message directly from the GPS satellites, and holds that data back until the corrections it receives in the NCS have the same iode as the ephemeris data it has received from the satellites. The navigator uses the ephemeris data and NCS correction data having the latest matching iode to calculate corrections appropriate to its position (e.g., which satellites are in view at the navigator, which vernier cell data are to be used, if any) and intended mission (e.g., whether the data is being used for code-phase navigation or RTK navigation).

Figure 24:
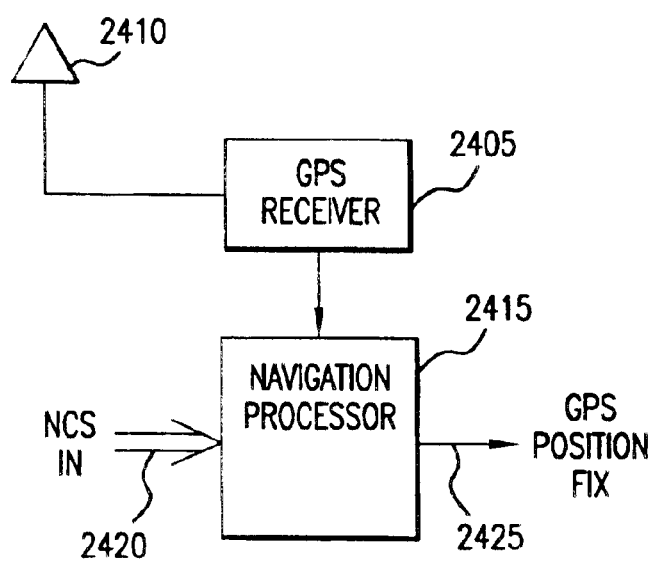
FIG. 24 shows schematically the primary elements of an integrated navigator in accordance with embodiments of the invention.

FIG. 24 shows schematically the primary elements of an integrated navigator 2400 in accordance with the invention. Navigator 2400 includes a GPS receiver 2405 with antenna 2410, and a navigation processor 2415. GPS receiver receives GPS satellite signals and provides measurements to the navigation processor 2415. Navigation processor 2415 also receives the NCS correction messages at an input 2420 and provides GPS position fixes at an output 2425 which can be displayed and/or supplied as an input to other machines or processes as desired.

Figure 25:
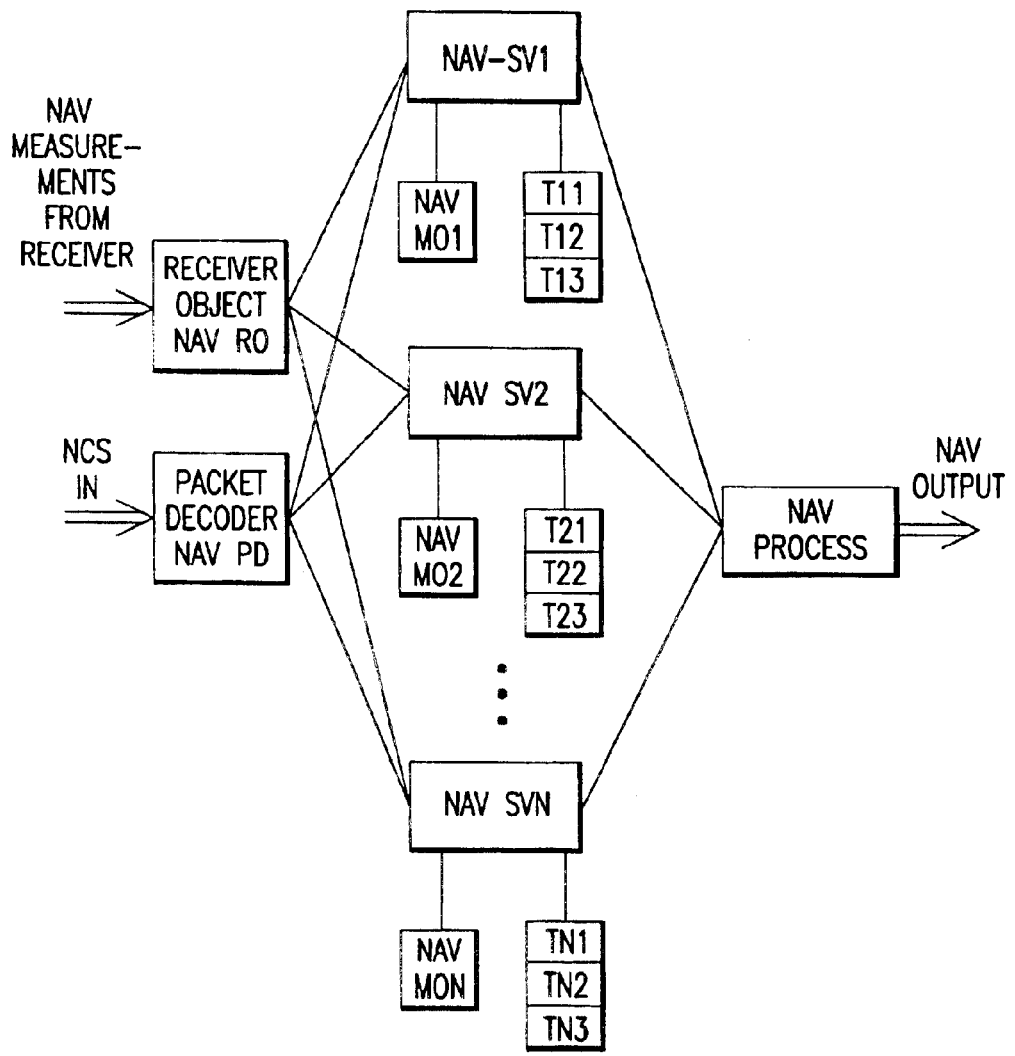
FIG. 25 shows the data flow in the navigation processor of FIG. 24 in accordance with embodiments of the invention.

FIG. 25 shows the data flow in the navigation processor. A respective satellite processing object NAV SV1, NAV SV2, . . . NAV SVN is instantiated for each satellite being tracked by the receiver. Each satellite object has an associated measurement object, e.g., NAV MO1 for NAV SV1 and NAV MON for NAV SVN, and a store for NCS message types 1, 2 and 3, e.g., T11 for message type 1 relating to satellite 1 and TN1 for message type 1 relating to satellite 1. A packet decoder NAV PA receives the NCS and passes data from the messages to the stores of the corresponding satellite objects. A receiver object NAV RO passes navigation measurements from the GPS receiver to the corresponding satellite objects.

Figure 26:
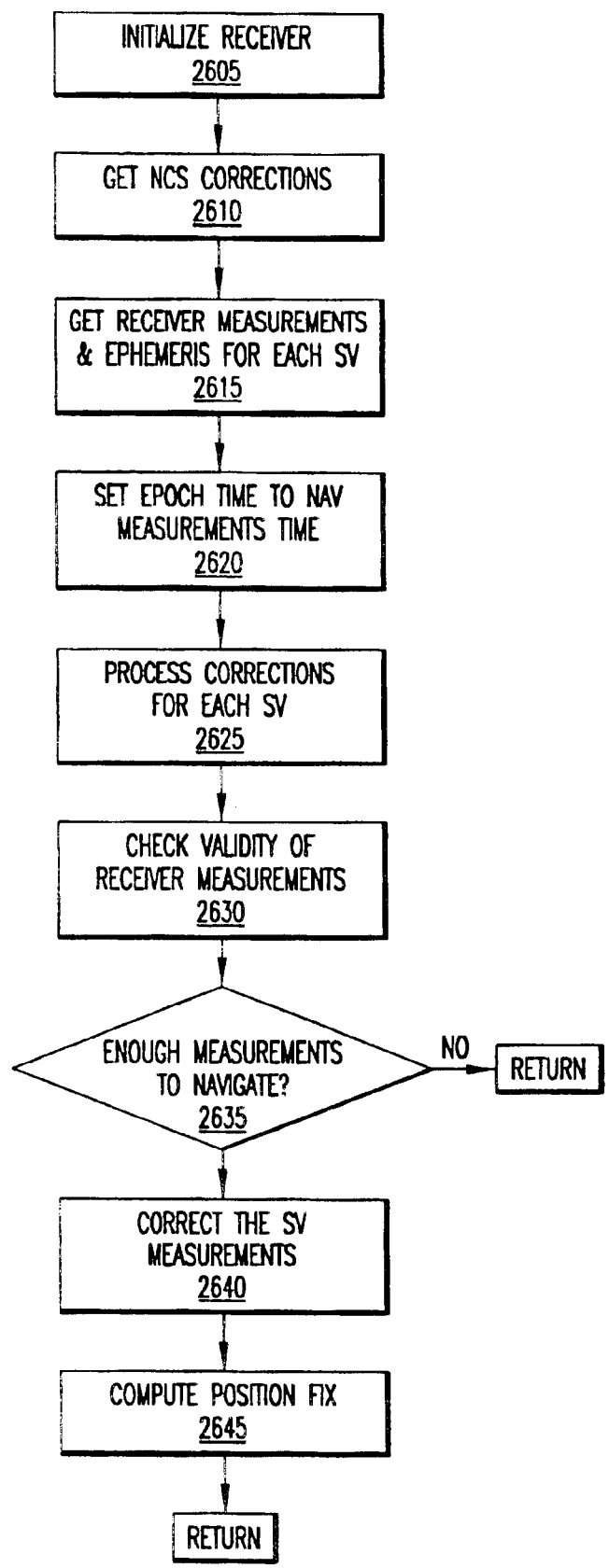
FIG. 26 shows high-level operational flow in the processor of an integrated navigator in accordance with embodiments of the invention.

FIG. 26 shows the high-level operational flow in the processor of an integrated navigator. The receiver is initialized at 2605 so that it will begin acquiring measurements from GPS satellites in view. The NCS corrections are acquired at 2610. Ephemeris data and satellite measurements are loaded from the receiver at 2615, e.g., to a satellite object instantiated for each satellite in view. The epoch time is set at 2620 to the time of the receiver measurements. Corrections are processed at 2625 for each satellite. Validity of the receiver measurements is checked at 2630, e.g., as described above with regard to FIG. 11 for reference station measurements in the network processor. A check is made at 2635 whether there are enough valid measurements to calculate, e.g., valid measurements with NCS corrections for at least four satellites. If not, the process returns, otherwise it proceeds to correct the receiver measurement for each satellite at 2640. A GPS position fix is computed at 2645 using the corrected receiver measurements.

Though shown sequentially for purposes of explanation, operations are carried out in multiple threads which can operate simultaneously. For example, get NCS corrections operation 2610 and get receiver measurements and ephemeris operation 2615 run continuously and the data is stored in a buffer. The time tags of receiver measurements are monitored and an epoch time is established when a set of measurements is available for processing. Process corrections for each satellite operation 2625 is performed whenever the required input data is ready. Likewise, correct the satellite measurements operation 2640 and compute position fix operation 2645 are performed whenever a data set is ready.

Figure 27:
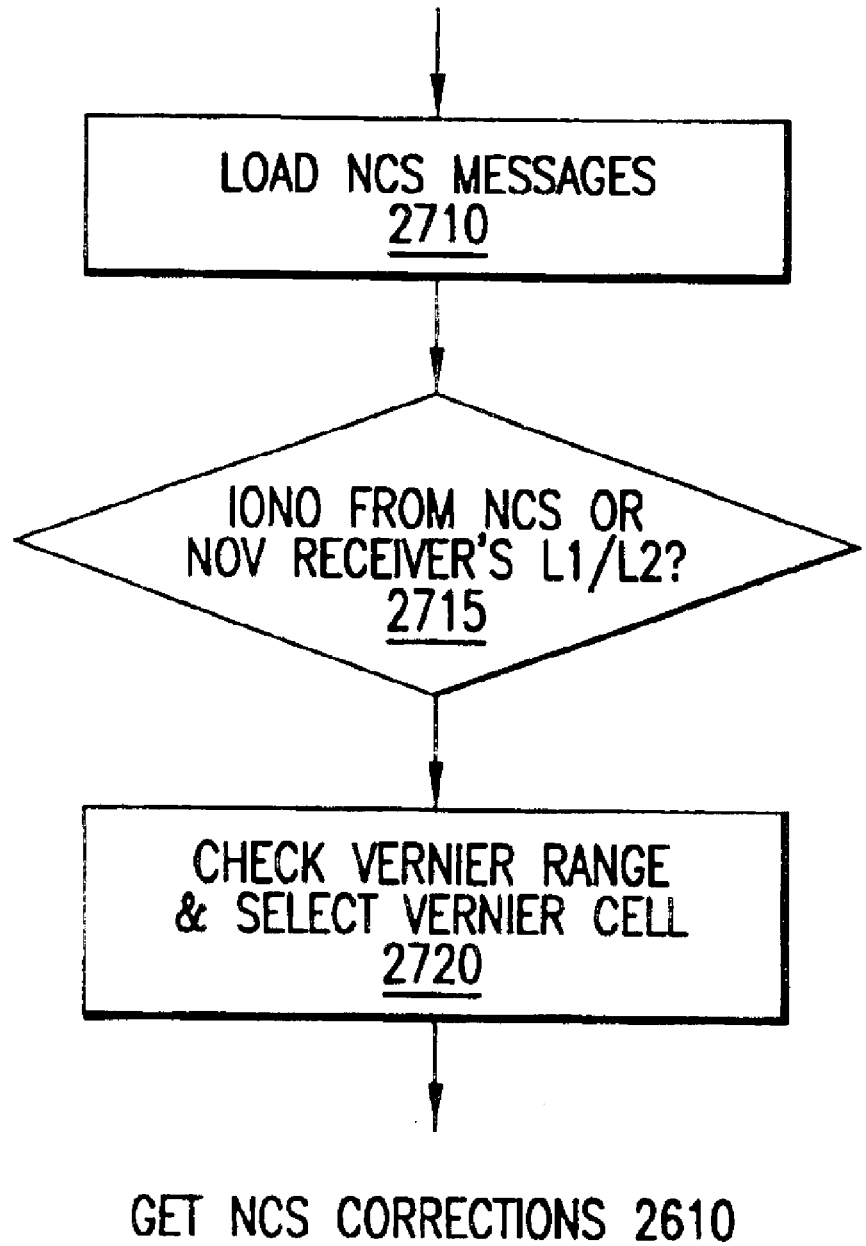
FIG. 27 shows in more detail the get NCS corrections operation 2610 of FIG. 26.

FIG. 27 shows in more detail the get NCS corrections operation 2610. The NCS messages are loaded at 2705 from the input stream. A selection is made at 2715 as to whether the iono corrections to be used are those provided in the NCS messages or those calculated locally from the receiver's L1 and L2 measurements. The NCS iono data will be used if the receiver has only L1 measurements. If the receiver has L1 and L2 measurements then either source may be selected, e.g., based on user preference. If a receiver position is available, e.g., from a prior position fix or from user input, then this position is checked against the vernier cell ranges to determined which vernier cell data, if any, is to be used in computing a position fix. As each vernier message arrives from the NCS it is compared with the most recently selected vernier cell in use, if any, to determine whether another vernier cell should now be selected. If the receiver position is within range of two vernier cells, then one of these is selected, e.g., the vernier cell with the smaller radius.

Figure 28:
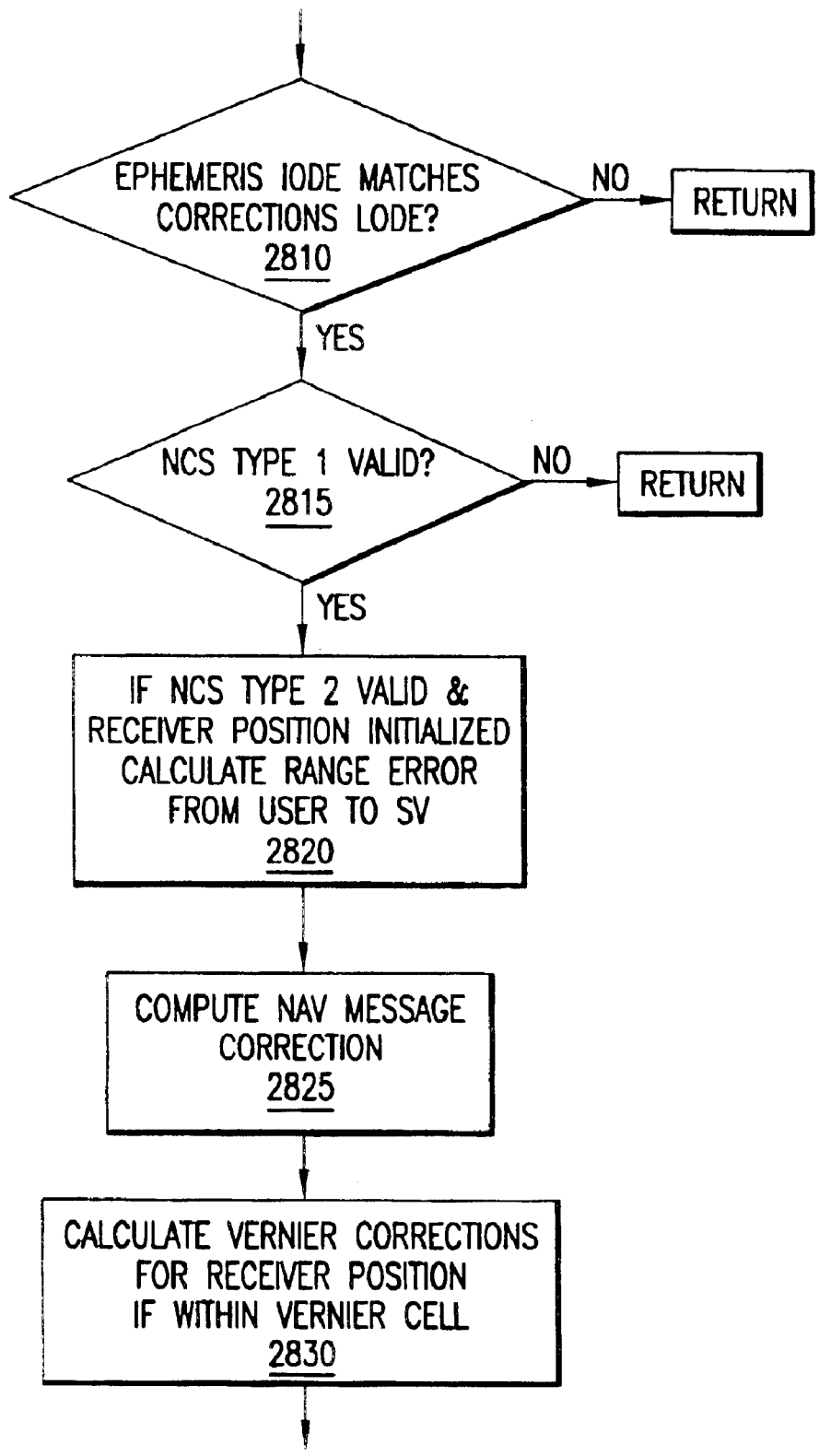
FIG. 28 shows in more detail the process corrections operation 2625 of FIG. 26.

FIG. 28 shows in more detail the process corrections operation 2625 which is carried out, e.g., for each satellite being tracked by the receiver. A check is made at 2310 whether the ephemeris iode matches the iode of the NCS corrections. If not, the process returns, otherwise a check of the NCS type 1 satellite clock-error message is made at 2815. If invalid, the process returns. If the NCS type 1 and 2 messages are valid, and the receiver position is initialized, then the range error from the receiver to each satellite is calculated at 2820. The range error to a satellite is calculated by taking the dot product of the position error vector for that satellite as provided in the NCS Type 2 message with the unit vector from the GPS receiver's position to the satellite's position as determined from the ephemerides. The range error can be further corrected for the rate of change of the satellite's clock, particularly if the satellite clock change is relatively rapid, e.g., due to Selective Availability. If Selective Availability is not in effect, then the Cesium clock in the satellite may be more reliable than would be the rate-of-change information obtained from the NCS, as the NCS messages may not be received without interruption, e.g., as a mobile navigator moves about it may experience periods of interruption of the NCS.

Corrections to the measurements are calculated at 2825 for the navigator's position. Vernier corrections are calculated at 2830 for the navigator's position if the navigator is within a vernier region and a valid NCS Type 3 vernier correction message is available. The vernier error-component v applicable for each satellite is determined from the error-field parameters a0, a1, a2 of the NCS Type 3 message as a function of the navigator's position (nav.lon, nav.lat) and the vernier cell's origin (vo.lon, vo.lat):

$$v = a0 + a1 \cdot R \cdot (nav.lon - vo.lon) \cdot \cos(vo.lat) + a2 \cdot R \cdot (nav.lat - vo.lat).$$

Figure 29:
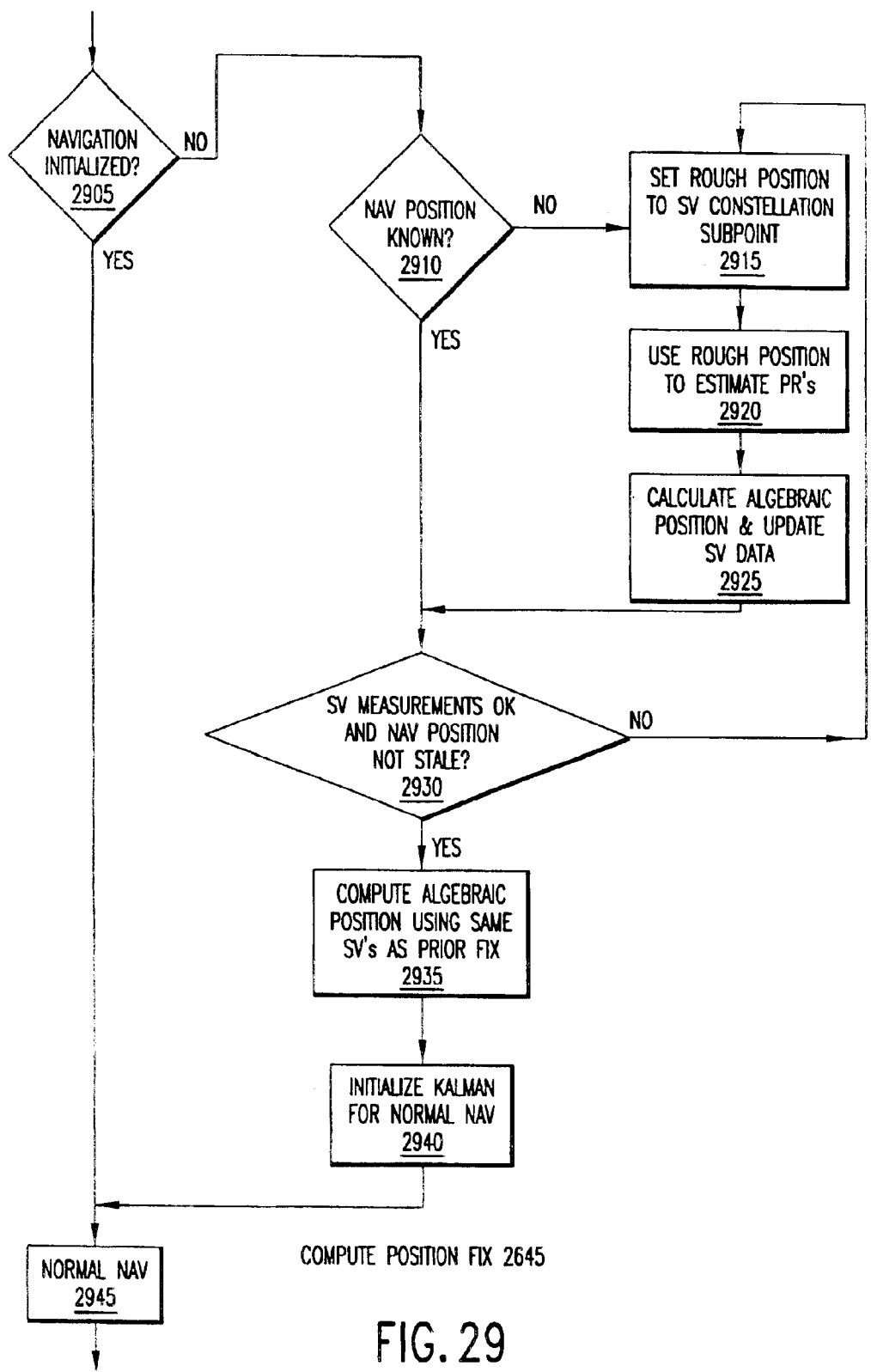
FIG. 29 shows in more detail the compute position fix operation 2645 of FIG. 26.
Figure 30:
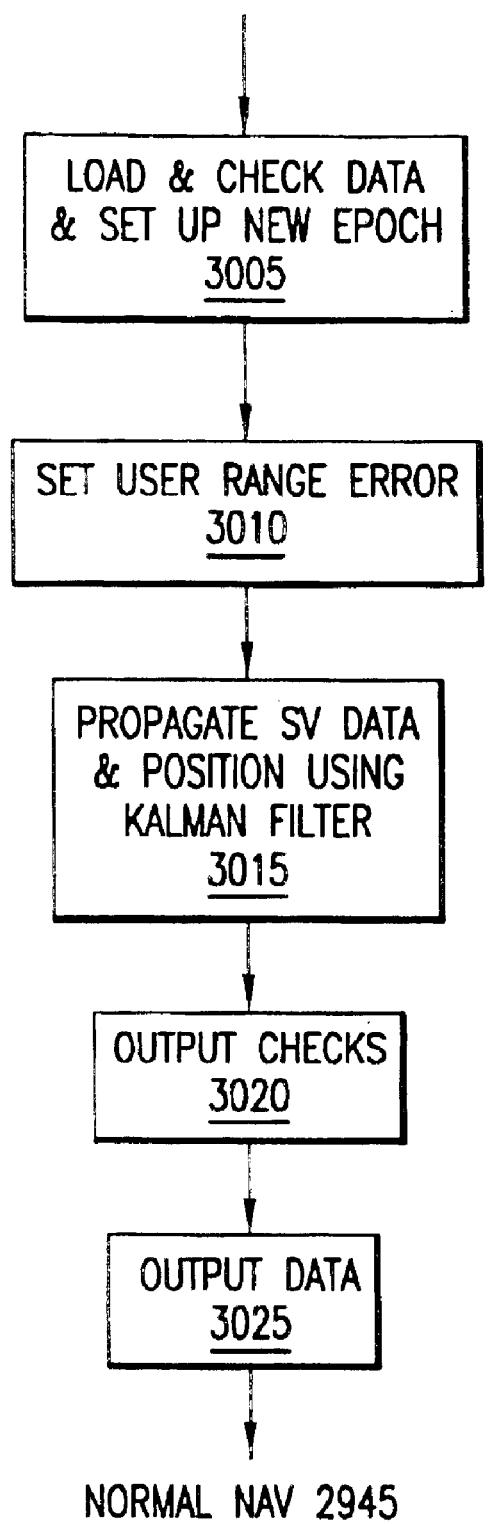
FIG. 30 shows in more detail the normal navigation operation 2945 of FIG. 29.

FIGS. 29 and 30 show in more detail the compute position fix operation 2645. A check is made at 2905 whether the navigation has been initialized, e.g., whether position fixes have already been calculated in normal navigation mode. This is determined, for example, from examining a status flag which has been set when normal navigation mode is attained as will be described below. If navigation has not been initialized, a check is made at 2910 whether a position for the navigator is known, e.g., from a prior position fix or from user input. If no position for the navigator is known, then a rough position is set at 2915 to a subpoint of the constellation of satellites from which the navigator is receiving signals. This is based on the assumption that if the receiver has measurements from a set of satellites it must be under that constellation. The subpoint can be, for example, the centroid on the sphere under the constellation. The rough position is used at 2920 to estimate pseudoranges to the satellites in view.

Using the rough position to calculate dilution-of-precision and to find unit vectors pointing to the satellites, an algebraic position calculation is iterated at 2925 to refine the position fix for the navigator and update the satellite position. Carrier smoothing is introduced, but the NCS corrections and iono and tropo corrections are not applied up to this point, so this algebraic position calculation is still approximate. If the navigator position is known at check operation 2910, or if position has been initialized at operation 2925, then a check is made at 2930 whether the satellite measurements are valid and the navigation position is not stale. If no, the process returns to operation 2915 for initialization of position. If yes, then an algebraic position is computed at 2935 using the same satellites used in computing the previous fix. This allows a first estimate of velocity, without introducing the error of another satellite clock. Also, the local iono correction is calculated if L1 and L2 measurements are available from the receiver, the satellite's azimuth and elevation are determined, carrier phase is adjusted, and carrier smoothing is performed. Validity checks are performed to assure consistency of the results. With the results of operation 2935, the states of a Kalman filter are initialized at 2940 for use in normal navigation operation 2945, and a flag is set to indicate the processor is ready for normal navigation at 2945.

FIG. 30 shows in more detail the normal navigation operation 2945. Measurements and NCS data are loaded, checked to be sure they are current for a new epoch, and a new epoch is set up at 3005. A user range error value is set at 3010 for each satellite, e.g., based on quality of correction data or standard deviations of corrected pseudoranges, and can be adjusted for low-elevation satellites. The navigator position solution is updated at 3015 using the Kalman filter. The output results are checked at 3020, the Kalman filter states are updated, and results are output at 3025.

The user range error values indicate to the Kalman filter how much weight to place on the measurement information. The Kalman filter serves to blend historical information with current measurements during each epoch. The output checks take various forms. For example, the adjusted pseudoranges are used to compute an algebraic GPS fix, e.g., an instantaneous calculation based on the current measurement set and position, and this is checked for consistency with the fix determined from the Kalman filter. Dilution-of-precision (dop) values are determined, e.g., gdop, and compared with established limits. Poor dop values indicate that the satellites being tracked are not well disposed for accurate position determination, e.g., as when the navigator is in a canyon and can only track satellites which are in a plane. If measurements are missing for too long or the co-variances become too big, the above-mentioned status flag is set so that the process will re-initialize during the next epoch.

Fixes obtained using the vernier cell corrections have been found to have improved accuracy over fixes obtained without the benefit of the vernier cells correction. The degree of improvement depends on many factors, including size of the network and of the vernier cell, density of reference stations in the network and the vernier cell, quality of receivers, quality of signal reception from the GPS satellites, multipath, etc. All other things being equal, accuracy with the vernier corrections has been found to be about twice as good as without the vernier corrections, e.g., a fix of 10–12 cm accuracy without the vernier cell corrections is improved to 5–6 cm accuracy with the vernier cell corrections. A nominal spacing of 100 km between reference stations within the vernier cells is typical, though improvement is still seen with even greater spacing. The improvement is expected to be even greater with iono corrections to enable RTK carrier phase positioning.

Glossary:

Carrier phase: GPS measurements based on the L1 or L2 carrier signal.

Clock bias: The difference between the clock's indicated time and GPS time.

Clock offset: Difference in the time reading between two clocks.

CMR (Compact Measurement Record): Format used in Trimble Real-Time-Kinematic (RTK) systems to transfer GPS carrier phase and code observations from a reference station to one or more mobile stations. Previously a proprietary standard, CMR is now published for open use.

Code phase GPS: GPS measurements based on the C/A code.

Earth-centered earth-fixed—ECEF: Cartesian coordinate system where the X direction is the intersection of the prime meridian (Greenwich) with the equator. The vectors rotate with the earth. Z is the direction of the spin axis.

Ephemeris: A list of accurate positions or locations of a celestial object as a function of time. Available as "broadcast ephemeris" or as postprocessed "precise ephemeris."

Epoch: Measurement interval or data frequency, as in making observations every 15 seconds. "Loading data using 30-second epochs" means loading every other measurement.

GPS ICD-200: The GPS Interface Control Document, published by the Joint Program Office of the U.S. Air Force, containing the full technical description of the interface between the satellites and the user.

Ionosphere: The band of charged particles 80 to 120 miles above the earth's surface, which represent a nonhomogeneous and dispersive medium for radio signals.

Ionospheric delay: A wave propagating through the ionosphere experiences delay. Phase delay depends on electron content and affects carrier signals. Group delay depends on dispersion in the ionosphere as well and affects signal modulation (codes). The phase and group delay are of the same magnitude but opposite sign.

Ionospheric refraction: The change in the propagation speed of a signal as it passes through the ionosphere.

Kalman filter: A numerical method used to track a time-varying signal in the presence of noise.

L-band: The group of radio frequencies extending from 390 MHz to 1550 MHz. The GPS carrier frequencies (1227.6 MHz and 1575.42 MHz) are in the L-band.

L1 signal: The primary L-band signal transmitted by each GPS satellite at 1572.42 MHz. The L1 broadcast is modulated with the C/A and P-codes and with the navigation message.

L2 signal: The second L-band signal is centered at 1227.60 MHz and carries the P-code and navigation message.

Multipath: Interference caused by reflected GPS signals arriving at the receiver, typically as a result of nearby structures or other reflective surfaces. Signals traveling longer paths produce higher (erroneous) pseudorange estimates and, consequently, positioning errors.

SV: Satellite vehicle or space vehicle

WGS-84 (World Geodetic System 1984): The mathematical ellipsoid used by GPS since January, 1987.

The contents of the following documents are incorporated herein by this reference:

U.S. patent application Ser. No. 09/019,495, filed Feb. 5, 1998, of James Robbins, for *Differential GPS Corrections Using Virtual Stations.*

U.S. Pat. No. 5,621,646 of Enge et al. for *Wide Area Differntial GPS Reference System and Method*

P. ENGE et al., *Wide Area Augmentation of the Global Positioning System*, PROCEEDINGS OF THE IEEE, Vol. 84, No. 8, August 1996, pages 1063–1088.

International Patent Publication Number WO 95/18977, published 13 Jul. 1995 of James E. Robbins for *A Network for Code Phase Differential GPS Corrections*

R. HATCH, *The Promise of a Third Frequency*, GPS WORLD, May 1996, pages 55–58.

U.S. Provisional Patent Application No. 60/255,987 of James E. Robbins filed Dec. 15, 2000.

ADDENDUM

The following describes a further example with ionospheric corrections from a network of GPS receivers.

Message sent to user (e.g., to mobile equipment 115):

The vertical component of ionospheric delay is sent in an NCS Type 6 message for each vernier cell. The NCS Type 6 message contains coordinates of the origin of the vernier cell, and, in addition to the vernier coefficients, a set of coefficients for a Taylor series description of a field which describes the vertical component of ionospheric delay as a function of the user's displacements East and North of the origin of the vernier cell.

User (or VRS) calculation:

Calculate horizontal x, y position in vernier cell as distance East and North of the origin.

Calculate vertical component of ionospheric delay at L1: Ionoz=i0+x*i1+y*i2, where i0, i1, i2, and the coordinates of the origin of the vernier cell are obtained from the NCS Type 6 message.

Calculate ionospheric delay for this satellite at user's location:

MetersIonoDelay = Ionoz / projectionToZenith( elevation ),
where
    double Cglint::projectionToZenith( double elevation )
    {
        double nu   =   asin( cos( elevation ) / ( 1 + mu ));
        return cos( nu );
    }, and
mu is the ratio of the mean ionospheric height to the earth's radius, taken as a constant.

Process for calculating the i0, i1, and i2 field coefficients in the network processor:

The primary problem involved is determination of the bias in transport time of GPS L2 signals with respect to L1 signals between the antenna and correlator at each reference station receiver. An auxiliary filter, f1, is used to address this problem. This filter, running on two-frequency ionospheric delay measurements from all references station receivers estimates corrections to be applied to the ionospheric delay paramters broadcast by the GPS satellites, along with the L2 bias for each receiver. Through cross-coupled iteration, biases for each receiver are obtained along with corrections for the broadcast parameters.

Calculation from each GPS measurement:

measionoDelayMetersL1=(pseudorangeL2−pseudorangeL1−
   rcvr.f2Bias)/(gammaIono−1)−*WGSc*\**sv*.ephemeris.*tGD*;

measionoDelayMetersL2=measionoDelayMetersL1\*gammaIono;

where
gammaIono is the squared ratio of the GPS L1 frequency to the GPS L2 frequency, and rcvr.f2Bias is the receiver's bias of L2 with respect to L1, as obtained iteratively from the f1 filter.

Modeled ionospheric delay is calculated using the single-frequency user calculations, except that the parameters broadcast by the GPS satellites have been modified iteratively by the f1 filter output. Modeled ionospheric delay is differenced with the delay calculated from the measurements to form a "measurement" for input to the f1 extended Kalman filter.

The debiased ionospheric measurements are projected onto the vertical, using ionoz=projectionToVertical(elevation)\*measionoDelayMetersL1, and the vertical values are filtered by individual filters, f2, running on each measurement, i.e., a filter for each receiver-satellite pair.

For each satellite, each vernier processor uses a least-squares estimator to obtain the i0,i1, and i2 coefficients from each of the f2-filtered ionoz values along with the vernier-region coordinates of the underlying reference stations.

With this process, the user (e.g., mobile equipment 115) doesn't have to calculate the ionospheric pierce point for the line between his location and the satellite. The field for each satellite, defined by i0, i1, and i2, describes the vertical component of iono delay for that satellite, as a function of the user's position within the vernier region. The user is immersed in a cluster of reference stations, and obtains a vertical delay which is a function of his position relative to these stations. Individual fields for each satellite in each vernier region provide localized accuracy without the complexity of a global or wide-area field or grid of the vertical component of ionospheric delay.

TABLE H

Exemplary NCS Message Summary

| | 9600 sub unit bits | sub-header bits | wrapper bits | |
|---|---|---|---|---|
| clock | 40 | | 72 | |
| position | 64 | | 72 | |
| sv vernier | 64 | 56 | 72 | |
| iono tropo | 88 | | 72 | |
| ephemeris | 480 | | 72 | |
| sv vernier SK | 112 | 56 | 72 | |
| Message Size: | | | | |
| nsvs | 12 | 18 | 24 | |
| clock | 552 | 792 | 1032 | |
| position | 840 | 1224 | 1608 | |
| sv vernier | 896 | 896 | 896 | \*12 svs per cell maximum |
| iono tropo | 160 | 160 | 160 | |
| ephemeris | 1992 | 1992 | 1992 | \*4 svs per message maximum |
| sv vernier sk | 1472 | 1472 | 1472 | \*12 svs per cell maximum |

| | repetition interval | repetitions per eph. cycle | Percent of Total Message | | |
|---|---|---|---|---|---|
| clock | 1 | 5 | | | |
| position | 1 | 5 | | | |
| sv vernier | 5 | 1 | | | |
| iono tropo | 5 | 1 | | | |
| ephemeris | 5 | 1 | | | |
| sv vernier sk | 5 | 1 | | | |
| nVerniers | 6 | | | | |
| Bits/eph cycle: | | | | | |
| nsv | 12 | 18 | 24 | 12 | 18 | 24 |
| clock | 2760 | 3960 | 5160 | 10.11 | 11.84 | 13.06 |
| position | 4200 | 6120 | 8040 | 15.38 | 18.30 | 20.34 |
| sv vernier | 5376 | 5376 | 5376 | 19.69 | 16.07 | 13.60 |
| iono tropo | 160 | 160 | 160 | 0.59 | 0.48 | 0.40 |
| ephemeris | 5976 | 9000 | 11952 | 21.89 | 26.91 | 30.24 |
| sv vernier sk | 8832 | 8832 | 8832 | 32.35 | 26.41 | 22.35 |
| total | 27304 | 33448 | 39520 | 100.00 | 100.00 | 100.00 |
| bit rate | 5460.80 | 6689.60 | 7904.00 | | | |
| bit rate loaded 8/5 | 8737 | 10703 | 12646 | | | |

Note:
Repetition intervals adjusted for SK network, which usually tracks about 12 SVs.

TABLE I

Exemplary NCS Message Summary

|  | sub unit bits | sub-header bits | wrapper bits |  |
|---|---|---|---|---|
| clock | 40 |  | 72 |  |
| position | 64 |  | 72 |  |
| sv vernier | 64 | 56 | 72 |  |
| iono tropo | 88 |  | 72 |  |
| ephemeris | 480 |  | 72 |  |
| Message Size: |  |  |  |  |
| nsvs | 12 |  |  |  |
| clock | 552 |  |  |  |
| position | 840 |  |  |  |
| sv vernier | 896 |  |  | *12 svs per cell maximum |
| iono tropo | 160 |  |  |  |
| ephemeris | 1992 |  |  | *4 svs per message maximum |

|  | repetition interval | repetitions per eph. cycle | Percent of Total Message |
|---|---|---|---|
| clock | 20 | 9 |  |
| position | 180 | 1 |  |
| sv vernier | 180 | 1 |  |
| iono tropo | 180 | 1 |  |
| ephemeris | 180 | 1 |  |
| nVerniers |  | 1 |  |
| Bits/eph cycle: |  |  |  |
| nsv | 12 |  | 12 |
| clock | 4968 |  | 38.69 |
| position | 840 |  | 6.54 |
| sv vernier | 896 |  | 6.98 |
| iono tropo | 160 |  | 1.25 |
| ephemeris | 5976 |  | 46.54 |
| total | 12840 |  | 100.00 |
| bit rate | 71.33 |  |  |
| bit rate loaded 8/5 | 114 |  |  |

TABLE J

Exemplary NCS Message Type 6

|  | Type 6 bits | lsb | max value |  |
|---|---|---|---|---|
| Vernier Reference |  |  |  |  |
| Vernier ID | 4 | 1 |  |  |
| range | 4 | 10^5 note 1 | 16 | meters |
| x0 | 16 | 200 | 6553400 | meters |
| y0 | 16 | 200 | 6553400 | meters |
| z0 | 16 | 200 | 6553400 | meters |
| nbits | 56 |  |  |  |
| nbytes | 7 |  |  |  |
| Satellite Error Field Correction |  |  |  |  |
| svID | 5 | 1 | 31 |  |
| quality | 3 | 1 | 7 |  |
| iode | 8 |  |  |  |
| a0 | 16 | 0.001 | 32.767 | meters |
| a1 | 16 | 0.00001 | 0.32767 | meters/kilometer |
| a2 | 16 | 0.00001 | 0.32767 | meters/kilometer |
| i0 | 16 | 0.001 | 32.767 | meters |
| i1 | 16 | 0.00001 | 0.32767 | meters/kilometer |
| i2 | 16 | 0.00001 | 0.32767 | meters/kilometer |
| nbits | 112 |  |  |  |
| nbytes | 14 |  |  |  |

TABLE J-continued

Exemplary NCS Message Type 6

|  | Type 6 bits | lsb | max value |
|---|---|---|---|
| Satellite Vernier Correction Message: |  |  |  |
| nSVs | 12 |  |  |
| wrapper | 72 |  |  |
| Vernier Reference | 56 |  |  |
| sub-message bits | 1344 |  |  |
| bits/message | 1472 |  |  |
| bytes/message | 184 |  |  | note 1: zero is interpreted as 0x2F * lsb to get a large max range

The foregoing description of implementations of the invention are presented for purposes of illustration and description. It is not exhaustive and does not limit the invention to the precise forms disclosed. Modifications and variations are possible in light of the above teachings or may be acquired from practicing of the invention. For example, the described implementation includes software but methods, systems, and articles of manufacture consistent with the invention may be implemented as a combination of hardware and software or in hardware alone. The invention may be implemented with object-oriented and/or non-object-oriented programming systems. The scope of the present invention is defined by the claims and their equivalents.

What is claimed is:

1. A method for synthesizing GPS satellite measurements for a declared location, comprising:
   a. receiving network correction data for an epoch comprising:
      i. Satellite ephemeris data;
      ii. Satellite clock corrections;
      iii. Satellite ephemeris corrections;
      iv. Atmospheric parameters; and
      v. residual error corrections derived from one or more reference stations located within a vernier-cell region;
   b. determining whether the declared location is within the vernier-cell region; and
   c. applying the network correction data to determine, for each of a plurality of satellites during an epoch: estimated L1 and L2 pseudorange measurements from the satellite to the declared location; and estimated phase delays for L1 frequency, for L2 frequency, and for a frequency representing a frequency difference between the L1 frequency and the L2 frequency.

2. The method of claim 1, further comprising applying the network correction data to determine, for each of a plurality of satellites during an epoch: a calculated satellite position; an atmospheric propagation delay from the calculated satellite position to the declared location; and a position error vector component affecting range at the declared location.

3. The method of claim 2, further comprising applying the network correction data to determine a vernier-cell correction for the declared location, for each of a plurality of satellites during an epoch.

4. The method of claim 3, wherein the vernier-cell correction v for each satellite is determined as $$v = a0 + a1 \cdot R \cdot (vrs.lon - vo.lon) \cdot \cos(vo.lat) + a2 \cdot R \cdot (vrs.lat - vo.lat)$$

in which
- a0, a1, a2=error-field coefficients applicable to the vernier-cell region, where a0 is a centroid component, a1 is an east-west slope, and a2 is a north-south slope
- R=radius of the earth
- vrs.lon=longitude of the declared location
- vo.lon=longitude of an origin of the vernier-cell region
- cos(vc.lat)=correction for earth's curvature
- vrs.lat=latitude of the declared location
- vo.lat=latitude of an origin of the vernier-cell region.

5. The method of claim 2, wherein determining atmospheric propagation delay comprises determining from the network correction data a tropospheric propagation delay from the calculated satellite position to the declared location.

6. The method of claim 5, wherein determining atmospheric propagation delay comprises determining from the network correction data an ionospheric propagation delay from the calculated satellite position to the declared location for the GPS L1 frequency, for the GPS L2 frequency, and for the frequency difference between the GPS L1 frequency and the GPS L2 frequency.

7. Apparatus having a processor far synthesizing GPS satellite measurements for a declared location and further comprising:
   a. a port for receiving network correction data for an epoch comprising:
      i. Satellite ephemeris data;
      ii. Satellite clock corrections;
      iii. Satellite ephemeris corrections;
      iv. Atmospheric parameters; and
      v. residual error corrections derived from one or more reference stations located within a vernier-cell region;
   b. software instructions to determine whether the declared location is within the vernier-cell region;
   c. software instructions to apply the network correction data to determine, for each of a plurality of satellites during an epoch: estimated L1 and L2 pseudorange measurements from the satellite to the declared location; and estimated phase delays for L1 frequency, for L2 frequency, and for the frequency difference between the L1 and L2 frequencies.

8. The apparatus of claim 7, further comprising software instructions to apply the network correction data to determine, for each of a plurality of satellites during an epoch: a calculated satellite position; an atmospheric propagation delay from the calculated satellite position to the declared location; and a position error vector component affecting range at the declared location.

9. The apparatus of claim 8, further comprising software instructions to apply the network correction data to determine, for each of a plurality of satellites during an epoch: vernier-cell corrections for the declared location.

10. The apparatus of claim 9, wherein the vernier-cell correction v for each satellite is determined as $$v = a0 + a1 \cdot R \cdot (vrs.lon - vo.lon) \cdot \cos(vo.lat) + a2 \cdot R \cdot (vrs.lat - vo.lat)$$

in which
- a0, a1, a2=error-field coefficients applicable to the vernier-cell region, where a0 is a centroid component, a1 is an east-west slope, and a2 is a north-south slope
- R=radius of the earth
- vrs.lon=longitude of the declared location
- vo.lon=longitude of an origin of the vernier-cell region
- cos(vc.lat)=correction for earth's curvature
- vrs.lat=latitude of the declared location
- vo.lat=latitude of an origin of the vernier-cell region.

11. The apparatus of claim 8, wherein the software instructions to determine atmospheric propagation delay comprise software instructions to determine from the network correction data a tropospheric propagation delay from the calculated satellite position to the declared location.

12. The apparatus of claim 11, wherein the software instructions to determine atmospheric propagation delay comprise software instructions to determine from the network correction data an ionospheric propagation delay from the calculated satellite position to the declared location for the GPS L1 frequency, for the GPS L2 frequency, and for a frequency representing a frequency difference between the OPS L1 frequency and the GPS L2 frequency.

13. Apparatus for synthesizing GPS satellite measurements for a declared location, comprising:
   a. means for receiving network correction data for an epoch comprising:
      i. Satellite ephemeris data;
      ii. Satellite clock corrections;
      iii. Satellite ephemeris corrections;
      iv. Atmospheric parameters; and
      v. residual error corrections derived from one or more reference stations located within a vernier-cell region;
   b. means for determining whether the declared location is within the vernier-cell region;
   c. means for applying the network correction data to determine, for each of a plurality of satellites during an epoch: estimated L1 and L2 pseudorange measurements from the satellite to the declared location; and estimated phase delays for the GPS L1 frequency, for the GPS L2 frequency, and for a frequency representing a frequency difference between the GPS L1 frequency and the GPS L2 frequency.

14. The apparatus of claim 13, further comprising means for applying the network correction data to determine, for each of a plurality of satellites during an epoch: a calculated satellite position; an atmospheric propagation delay from the calculated satellite position to the declared location; and a position error vector; an error-vector component affecting range at the declared location.

15. The apparatus of claim 14, further comprising means for applying the network correction data to determine, for each of a plurality of satellites during an epoch: vernier-cell corrections for the declared location.

16. The apparatus of claim 15, wherein the vernier-cell correction v for each satellite is calculated as $$v = a0 + a1 \cdot R \cdot (vrs.lon - vo.lon) \cdot \cos(vo.lat) + a2 \cdot R \cdot (vrs.lat - vo.lat)$$

in which
- a0, a1, a2=error-field coefficients applicable to the vernier-cell region, where a0 is a centroid component, a1 is an east-west slope, and a2 is a north-south slope
- R=radius of the earth
- vrs.lon=longitude of the declared location
- vo.lon=longitude of an origin of the vernier-cell region
- cos(vc.lat)=correction for earth's curvature vrs.lat=latitude of the declared location vo.lat=latitude of an origin of the vernier-cell region.

17. The apparatus of claim 14, wherein the means for determining atmospheric propagation delay comprises means for determining from the network correction data a tropospheric propagation delay from the calculated satellite position to the declared location.

18. The apparatus of claim 17, wherein the means for determining atmospheric propagation delay comprises means for determining from the network correction data an ionospheric propagation delay from the calculated satellite position to the declared location for the GPS L1 frequency, for the GPS L2 frequency, and for a frequency representing a frequency difference between the GPS L1 frequency and the GPS L2 frequency.

19. A method of determining a corrected GPS position fix, comprising:
   a. obtaining network corrections determined from measurements taken at a plurality of GPS reference stations and residual error corrections derived from one or more reference stations located within a vernier-cell region;
   b. for each of a plurality of satellites in view at a navigator location, receiving GPS ephemeris data and obtaining GPS receiver measurements;
   c. determining, from the GPS ephemeris data and the network corrections and the residual error corrections, calculated corrections appropriate to the navigator location for each of the plurality of satellites;
   d. applying the calculated corrections to the GPS receiver measurements to obtain corrected measurements; and
   e. computing a position fix from the corrected measurements.

20. The method of claim 19, wherein determining calculated corrections comprises applying the residual error corrections to determine, for each of a plurality of satellites during an epoch: vernier-cell corrections for the navigator location.

21. The method of claim 20, wherein the vernier-cell correction v for each satellite is determined as $$v = a0 + a1 \cdot R \cdot (vrs.lon - vo.lon) \cdot \cos(vo.lat) + a2 \cdot R \cdot (vrs.lat - vo.lat)$$

in which
   a0, a1, a2=error-field coefficients applicable to the vernier-cell region, where a0 is a centroid component, a1 is an east-west slope, and a2 is a north-south slope
   R=radius of the earth
   vrs.lon=longitude of the declared location
   vo.lon=longitude of an origin of the vernier-cell region
   cos(vc.lat)=correction for earth's curvature
   vrs.lat=latitude of the declared location
   vo.lat=latitude of an origin of the vernier-cell region.

22. Apparatus for determining a corrected GPS position fix, comprising:
   a. a GPS receiver to receive GPS ephemeris data and to obtain GPS receiver measurements for each of a plurality of satellites in view at a navigator location; and
   b. a navigation processor, responsive to network corrections determined from measurements taken at a plurality of OPS reference stations and residual error corrections derived from one or more reference stations located within a vernier-cell region, to
      i. Determine, from the GPS ephemeris data and the network corrections and the residual error corrections, calculated corrections appropriate to the navigator location for each of the plurality of satellites;
      ii. Apply the calculated corrections to the GPS receiver measurement to obtain corrected measurements; and
      iii. Compute a corrected GPS position fix from the corrected measurements.

23. The apparatus of claim 22, wherein the navigation processor determines the calculated corrections by applying the residual error corrections to determine, for each of a plurality of satellites during an epoch: vernier-cell corrections for the navigator location.

24. The method of claim 23, wherein the vernier-cell correction v for each satellite is determined as $$v = a0 + a1 \cdot R \cdot (vrs.lon - vo.lon) \cdot \cos(vo.lat) + a2 \cdot R \cdot (vrs.lat - vo.lat)$$

in which
   a0, a1, a2=error-field coefficients applicable to the vernier-cell region, where a0 is a centroid component, a1 is an east-west slope, and a2 is a north-south slope
   R=radius of the earth
   vrs.lon=longitude of the navigator location
   vo.lon=longitude of an origin of the vernier-cell region
   cos(vc.lat)=correction for earth's curvature
   vrs.lat=latitude of the navigator location
   vo.lat=latitude of an origin of the vernier-cell region.

25. Apparatus for determining a corrected GPS position fix, comprising:
   a. receiver means for receiving GPS ephemeris data and obtaining GPS receiver measurements for each of a plurality of satellites in view at a navigator location;
   b. processor means, responsive to network corrections determined from measurements taken at a plurality of GPS reference stations and residual error corrections derived from one or more reference stations located within a vernier-cell region, for
      i. Determining, from the GPS ephemeris data and the network corrections and the residual error corrections, calculated corrections appropriate to the navigator location for each of the plurality of satellites;
      ii. Applying the calculated corrections to the GPS receiver measurement to obtain corrected measurements; and
      iii. Computing a corrected GPS position fix from the corrected measurements.

26. The apparatus of claim 25, wherein the processor means is further operative for determining the calculated corrections by applying the residual error corrections to determine, for each of a plurality of satellites during an epoch: vernier-cell corrections for the navigator location.

27. The method of claim 26, wherein the vernier-cell correction v for each satellite is determined as $$v = a0 + a1 \cdot R \cdot (vrs.lon - vo.lon) \cdot \cos(vo.lat) + a2 \cdot R \cdot (vrs.lat - vo.lat)$$

in which
   a0, a1, a2=error-field coefficients applicable to the vernier-cell region, where a0 is a centroid component, a1 is an east-west slope, and a2 is a north-south slope
   R=radius of the earth
   vrs.lon=longitude of the navigator location
   vo.lon=longitude of an origin of the vernier-cell region
   cos(vc.lat)=correction for earth's curvature
   vrs.lat=latitude of the navigator location
   vo.lat=latitude of an origin of the vernier-cell region.

* * * * *